US012670516B2

(12) United States Patent
Adcock et al.

(10) Patent No.: US 12,670,516 B2
(45) Date of Patent: Jun. 30, 2026

(54) SYSTEMS AND METHODS FOR MODIFICATION OF MACHINE LEARNING MODEL-GENERATED TEXT AND IMAGES BASED ON USER QUERIES AND PROFILES

(71) Applicant: Capital One Services, LLC, McLean, VA (US)

(72) Inventors: Lee Adcock, Midlothian, VA (US); Bryce Freshcorn, Arlington, VA (US); Arindam Chakraborty, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 168 days.

(21) Appl. No.: 18/596,946

(22) Filed: Mar. 6, 2024

(65) Prior Publication Data

US 2025/0285155 A1 Sep. 11, 2025

(51) Int. Cl.
*G06Q 30/06* (2023.01)
*G06F 40/284* (2020.01)
*G06Q 30/0601* (2023.01)

(52) U.S. Cl.
CPC ....... *G06Q 30/0627* (2013.01); *G06F 40/284* (2020.01); *G06Q 30/0643* (2013.01)

(58) Field of Classification Search
CPC ............. G06Q 30/043; G06Q 30/0621; G06Q 30/0627; G06F 16/9538; G06F 16/9535; G06N 3/0465
USPC .......................................... 705/27.2; 707/722
See application file for complete search history.

(56) References Cited

U.S. PATENT DOCUMENTS 10,417,675 B2 * 9/2019 Farraro ................. G06F 16/248
2024/0202796 A1 * 6/2024 Sadr ................... G06Q 30/0621
2024/0420216 A1 * 12/2024 Stankiewicz ...... G06Q 30/0643
2025/0094866 A1 * 3/2025 Wang ..................... G06N 20/00
(Continued)

FOREIGN PATENT DOCUMENTS

CN 114904270 A * 8/2022 ........... G06F 18/253

OTHER PUBLICATIONS

D. Deepika, G. Sindhu, K. Nikhil, K. N. B. Sree and Y. H. Vardhan, “Generation of Smart Text Book using AI,” 2023 4th IEEE Global Conference for Advancement in Technology (GCAT), Bangalore, India, 2023, pp. 1-6, retrieved from IP.Com on Oct. 15, 2025 (Year: 2023).*

(Continued)

*Primary Examiner* — Yogesh C Garg
(74) *Attorney, Agent, or Firm* — Foley & Lardner LLP

(57) ABSTRACT

Systems and methods for generating user-specific textual and image-based outputs corresponding to existing items, in response to user queries, are disclosed herein. For example, the system may receive a query that includes a textual description. The system may retrieve a user profile for a user associated with the query. Based on the query, the system may obtain a description of an item. Based on the query, the user profile, and the description, the system may generate an output and an image using a machine learning model. Based on the output and the image, the system may generate a graphical representation of the item. The system may receive a selection of the graphical representation of the item. Based on the selection of the graphical representation, the system may enable access to the first item.

18 Claims, 8 Drawing Sheets

(56) References Cited

U.S. PATENT DOCUMENTS

| | | | | |
|---|---|---|---|---|
| 2025/0166040 | A1* | 5/2025 | Dissanayake .......... | G16H 50/20 |
| 2025/0200635 | A1* | 6/2025 | Unnikrishnan ......... | G06F 40/40 |

OTHER PUBLICATIONS

Durante et al.; " Agent AI: Surveying the Horizons of Multimodal Interaction"; ARXIV ID: 2401.03568 Publication Date: Jan. 7, 2024 retrieved from IP.Com on 02092026 (Year: 2024).*

* cited by examiner

200

| User Identifier 204 | User ID 1 |
|---|---|

| User Activity Log 202 | |
|---|---|
| Timestamp 206 | Item Query 208 |
| Timestamp 1 | Query 1 |
| Timestamp 2 | Query 2 |
| Timestamp 3 | Query 3 |
| Timestamp 4 | Query 4 |
| Timestamp 5 | Query 5 |
| Timestamp 6 | Query 6 |
| Timestamp 7 | Query 7 |

| Item Description Database 302 | | | |
|---|---|---|---|
| Item Identifier 304 | Item Attributes 306 | | |
| | Style 308a | Location 308b | Features 308c |
| Identifier 1 | Style 1 | Location 1 | Features 1 |
| Identifier 2 | Style 2 | Location 2 | Features 2 |
| Identifier 3 | Style 3 | Location 3 | Features 3 |
| Identifier 4 | Style 4 | Location 4 | Features 4 |
| Identifier 5 | Style 5 | Location 5 | Features 5 |
| Identifier 6 | Style 6 | Location 6 | Features 6 |
| Identifier 7 | Style 7 | Location 7 | Features 7 |

Receive a query including a textual description
702

Retrieve a user profile including user data
704

Obtain a description of an item
706

Generate an output and image using a machine learning model
708

Generate a graphical representation of the item
710

Receive a selection of the graphical representation
712

Enable access to the item
714

800

Receive a query including a textual description
802

Retrieve a user profile including user data
804

Generate outputs and images using a machine learning model
806

Generate graphical representations for the outputs and images
808

Receive a selection of a graphical representation
810

Enable access to an item
812

SYSTEMS AND METHODS FOR MODIFICATION OF MACHINE LEARNING MODEL-GENERATED TEXT AND IMAGES BASED ON USER QUERIES AND PROFILES

BACKGROUND

Artificial intelligence has revolutionized content creation. For example, large language models (LLMs) enable generation of text and other representations of natural language based on a user's prompts. For example, through use of neural networks (e.g., in a transformer architecture), LLMs enable generation of words, sentences, paragraphs, and documents based on predicting natural language tokens from their contextual environment. Moreover, artificial intelligence engines enable generation of other types of media, such as audio or images. For example, image generators enable generation of illustrations, drawings, or other images based on user prompts or queries. As such, artificial intelligence provides users with various ways of generating content from written descriptions. However, such artificial intelligence applications can be limited by biases and other flaws associated with training data, thereby leading to potentially inaccurate results or results that are irrelevant to the user. Furthermore, generative artificial intelligence can be susceptible to hallucinations, leading to results that may not reflect reality.

SUMMARY

In pre-existing search and result generation systems (e.g., image- or text-based search engines), a user may specify a query for generation of pre-existing images or content. For example, a web search algorithm may compare tokens associated with a user's query with existing websites or image descriptions to generate a list of potentially relevant results for the user based on results. However, such search result generation systems are limited to pre-existing content that has already been generated and stored on a searchable medium (e.g., the internet). As such, these result-generation systems may not provide results that are relevant or engaging to the user. For example, a user of a search engine searching for a particular computational device, with a particular hardware configuration, may not see results related to such a device in situations where the device is not yet in use. Even in situations where the device may be used, the user's desired features may not be highlighted or emphasized, potentially leading the user to believe that the results are irrelevant or inconsistent with the user's original query. As such, pre-existing search engines may not account for a user's preferences when generating results for display to the user.

Artificial intelligence enables generation of results tuned to a user's query, even if such generated content did not previously exist. In pre-existing artificial intelligence-based content generation systems, machine learning models enable generation of text, images, audio, or other content based on a user's input. Such text and images are limited by the training data associated with the given model, as well as the precise nature of the prompt provided by the user. For example, such generative machine learning models, on their own, may not be trained on the latest developments in technology or existing items. As such, in response to a user's query relating to a particular computational device, such pre-existing systems may fail to generate a result that accurately depicts the currently existing technologies. Hallucinations may cause such results to be unrealistic or inaccurate, thereby leading the user to lose trust in the results. Furthermore, such results may not take a user's previous queries and preferences into account, as text or images generated by generative models may provide results on the basis of the current query alone. As such, results generated from such search engines or generative models may not accurately depict a user's desired item (e.g., a hardware-based computing system with particular features).

The methods and systems disclosed herein enable generation of personalized descriptions of desired items that focus on the items' queries that are most relevant to a given user. For example, the system enables generation of representations of existing items, such as computing systems and associated hardware components, where these representations emphasize aspects of the items that are most relevant to the user and the user's query. The system may generate or modify a textual description and synthetic image based on a user profile and a query from the user. The generated textual description and the synthetic image may include natural language tokens or aspects that emphasize particular features of an existing item that are determined to be consistent with features associated with the user profile and/or the query. Upon receiving a selection of this item from the user, the system enables provision of a representation of the item to the user. By doing so, the system enables provision of user-specific descriptions and image representations of existing items, such as computing systems, where such representations adapt to the features or aspects relevant to the user, thereby improving user engagement and the system's effectiveness for presenting results based on the user's query.

For example, by receiving a user profile associated with the user and providing this information to the artificial intelligence model, the system enables generation of user-specific results that are tuned to attributes, characteristics, and history associated with the user. For example, if the user has previously requested results associated with a computing system with a solid-state drive and a United Kingdom keyboard layout, the system may provide results that are consistent with and that highlight these features, even if these features are absent from the user's current query or prompt. Furthermore, by modifying or representing existing items with updated descriptions or images, the machine learning model enables realistic results that are associated with existing items (e.g., existing computing systems), thereby reducing the incidence of model hallucinations or inaccurate results. As such, the systems and methods disclosed herein enable user-specific, personalized generation of search results on the basis of a characterization of the user, as well as an emphasis of features associated with the user's desired results.

In some aspects, the system may receive a query that includes a textual description. For example, the system may receive, from a user, a first query including a textual description. As an illustrative example, the system may receive a query from the user, such as a text string with a description or indication of features associated with an item desired by the user. As an illustrative example, the user may specify, within this query, a computing system with a number of desired features or hardware components, such as a solid-state drive, or an indication of associated peripherals. By receiving a query from the user, the system enables generation of results in a user-specific manner based on the user's query and other characteristics associated with the user.

In some aspects, the system may retrieve a user profile associated with the user. For example, the system may retrieve, using a user identifier associated with the user, a user profile for the user, where the user profile includes user data including a plurality of queries associated with the user identifier. For example, the system may obtain information that characterizes the user, including the user's identity or alias, a user type (e.g., whether the user is an administrator), as well as a user history specifying the user's previous queries. For example, the user may request a "computing system" in the current query, but may have requested a "computing system with a solid-state drive" in previous queries. By receiving such information, the system may better tailor generated results to improve their relevance to the user, based on information associated with the user.

In some aspects, the system may obtain a description of an item. For example, based on the first query, the system may obtain a first description of a first item. As an illustrative example, the system may retrieve, from an item description database, a description of an item that is consistent with the user's query (and/or the user profile). For example, the system may determine that an existing computing system includes the likely features and aspects of the user's desired computing system. Based on this determination, the system may retrieve a description of this existing item. By doing so, the system enables determination of existing items that may be relevant to the user's query.

In some aspects, the system may provide the user profile, the query, and the description to a machine learning model to generate an output and an image. For example, the system may provide the user profile, the first query, and the first description to a machine learning model to cause the machine learning model to generate a first output and a first image, where the first output includes an indication of a plurality of features corresponding to the first description and the user profile. In some embodiments, characteristics of the first image correspond to the plurality of features. As an illustrative example, the system may generate a description of the existing item, as well as a corresponding synthetic image, based on the user's query and characteristics associated with the user (e.g., the user's previous search history). For example, the machine learning model may include artificial intelligence that enables language generation (e.g., an LLM) and image generation (e.g., an image generator) based on input prompts. Thus, the system may generate a personalized representation of the existing item, including a personalized description and image of the item (e.g., a computing system that is relevant to the user), based on the user's query in a tunable and personalized manner. The description can emphasize or highlight features determined to be important to the user, such as a description of or an image of particular peripherals or hardware components associated with the user query and/or the user profile.

In some aspects, the system may generate a graphical representation of the item. For example, the system may generate a first graphical representation of the first item, where the first graphical representation of the first item includes the first image and a representation of the first output. As an illustrative example, the system may generate an icon and/or a result for display on a user interface. For example, the system may add the generated image and description to a graphical user interface (GUI) for display to the user, along with other relevant results, where the GUI enables selection of a given result. For example, the system may generate a graphical indication of a computing system that is available for use by the user, where the computing system is represented in a manner that highlights features that are relevant to the user's query. By doing so, the system may generate an engaging representation of generated results for user selection.

In some aspects, the system may receive a selection of the graphical representation (e.g., the first graphical representation) of the item (e.g., the first item). As an illustrative example, the user may click or interact with the result, including the graphical representation, on the GUI. The system may detect or receive an indication of this selection. For example, the system may receive an indication that the user selected a particular computing system, with a specific hardware architecture and set of features. By receiving a selection from the user, the system enables subsequent provision of the item requested by the user, consistent with the user's query and desired item.

In some aspects, the system may enable access to the item based on the selection of the graphical representation of the item. For example, based on receiving the selection of the first graphical representation of the first item, the system may enable access to the first item. As an illustrative example, the system may receive a click or interaction of a particular GUI representation of the item by the user; based on this interaction, the system may enable access to the item. For example, the system may enable a user to schedule time on the selected computing system, or enable the user to access this system in another way. As such, the system enables provision of requested items to users on the basis of results that are personalized, thereby improving user engagement in the system.

The methods and systems disclosed herein enable generation of personalized item searches based on a user's query and other information associated with the user. For example, the system may generate an improved selection of existing items based on a user's query and metadata associated with the user. The system may generate multiple synthetic outputs and images corresponding to a user's query and user data associated with the user, such as a user profile. These synthetic outputs and inputs may not directly correspond to existing items. As an illustrative example, the system may generate a set of images and corresponding descriptions that are representative of the user's query, such as a set of images showing a computing system with features or characteristics identified by the user within the query or associated with the user's profile. Based on these multiple outputs, the system may match existing items to these personalized textual descriptions of items, thereby enabling a user to select a desired graphical representation of an item on a user interface for access to items that may satisfy the user's query. By doing so, the system may present a user with existing items similar to a desired item, thereby improving the relevance of the results shown to the user, as well as user engagement with the system. For example, by generating synthetic descriptions and images associated with personalized items that match the user's query, the system enables the user to specify preferences to a greater level of detail. Based on the user's selection, the system may select an item for provision to the user that more accurately reflects the requested item. By doing so, the system enables generation of user-specific results for the user, thereby improving the accuracy and relevance of shown results.

In some aspects, the system may receive a query with a textual description. For example, the system may receive, from a user, a first query that includes a textual description. As an illustrative example, the system may receive a query for a computing device with particular hardware components (e.g., a solid-state drive and an indication of requested peripherals). For example, the system may receive a text string (e.g., within a text field) that includes a natural language prompt requesting this computing device. By receiving such a request from a user, the system enables generation of results that are tailored for the user based on the user's selection of a personalized representation of the requested item, as described below.

In some aspects, the system may retrieve a user profile for the user. For example, the system may retrieve, using a user identifier associated with the user, a user profile for the user. In some embodiments, the user profile includes user data including a plurality of queries associated with the user identifier. As an illustrative example, the system may match a user identifier associated with the user query with a database of previous queries submitted by the user. In some embodiments, the user profile may include information relating to such previous queries, as well as information relating to the user. For example, the user profile may include previous queries relating to hardware or computing devices of interest to the user. By retrieving such information, the system enables generation of user-specific and user-tailored results relating to the user's query.

In some aspects, the system may provide the user data and query to a machine learning model to generate outputs and images. For example, the system may provide the user data and the first query to a machine learning model to cause the machine learning model to generate a plurality of outputs and a corresponding plurality of images. In some embodiments, each output of the plurality of outputs includes a corresponding description describing a plurality of features associated with the user data and the first query. In some embodiments, one or more characteristics of a corresponding image of the corresponding plurality of images correspond to the plurality of features. As an illustrative example, the system may generate multiple images and corresponding textual descriptions that represent personalized representations of an item requested within the user's query. For example, the system may generate, in response to a query for a computing device with particular features, a set of images and corresponding textual descriptions that are associated with different computing devices that include these features (e.g., with differing highlighted features). For example, in response to a user's query requesting a computing device with a solid-state drive and a mouse, the system may generate a first image that includes a representation of a computing device with a solid-state drive, and a second image that includes a representation of a computing device with a mouse. By generating multiple images that may correspond to the user's query, the system provides a user with multiple possible synthetic representations of the user's query, thereby enabling the user to select and narrow down a preferred version or implementation of the requested item.

In some aspects, the system may generate graphical representations of the outputs and corresponding images. For example, the system may generate a plurality of graphical representations for the plurality of outputs and the corresponding plurality of images, where each graphical representation of the plurality of graphical representations includes the corresponding description and the corresponding image. As an illustrative example, the system may display the generated outputs and corresponding images for the synthetic representations of the user's query on a GUI accessible to the user. By doing so, the system may present various synthetic representations of the user's query to the user, thereby enabling the user to provide further information relating to any important features within the user's request.

In some aspects, the system may receive a selection of a graphical representation. For example, the system may receive a selection of a first graphical representation of the plurality of graphical representations. As an illustrative example, the system enables a user to select a graphical representation within the GUI (e.g., using a click or another user control), thereby marking a user's preferred representation or implementation of the synthetic images and descriptions. For example, the user may determine to click on a graphical representation that corresponds to a computing device with a solid-state drive of a particular size, thereby providing information to the system regarding the user's preferred version or representation of a requested item. By doing so, the system obtains information relating to a user's preferences, thereby enabling the system to present more accurate results to the user.

In some aspects, based on receiving the selection of the graphical representation, the system may enable access to a corresponding item. For example, based on receiving the selection of the first graphical representation, the system may enable access to a first item corresponding to the first graphical representation. As an illustrative example, the system may determine similarities between the user's chosen graphical representation of the user's query and a corresponding item from a database of existing items (e.g., an item description database). For example, the system may determine an existing item (e.g., an existing computing device) that is similar to an item corresponding to the synthetic text and image description from the selected graphical representation. The system may enable a user's access to this item based on the user's selection. As such, the user may access the requested computing device or other item, where this item is similar to the user's query. By doing so, the system enables the user to select and receive an existing item based on personalized, synthetic images and descriptions presented to the user, thereby improving the accuracy of the item suggested to the user.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "of" means "and/of" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative schematic of a user activity log including previous user queries, in accordance with one or more embodiments.

FIG. 3 shows an illustrative schematic of an item description database associated with existing items relevant to the user query, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
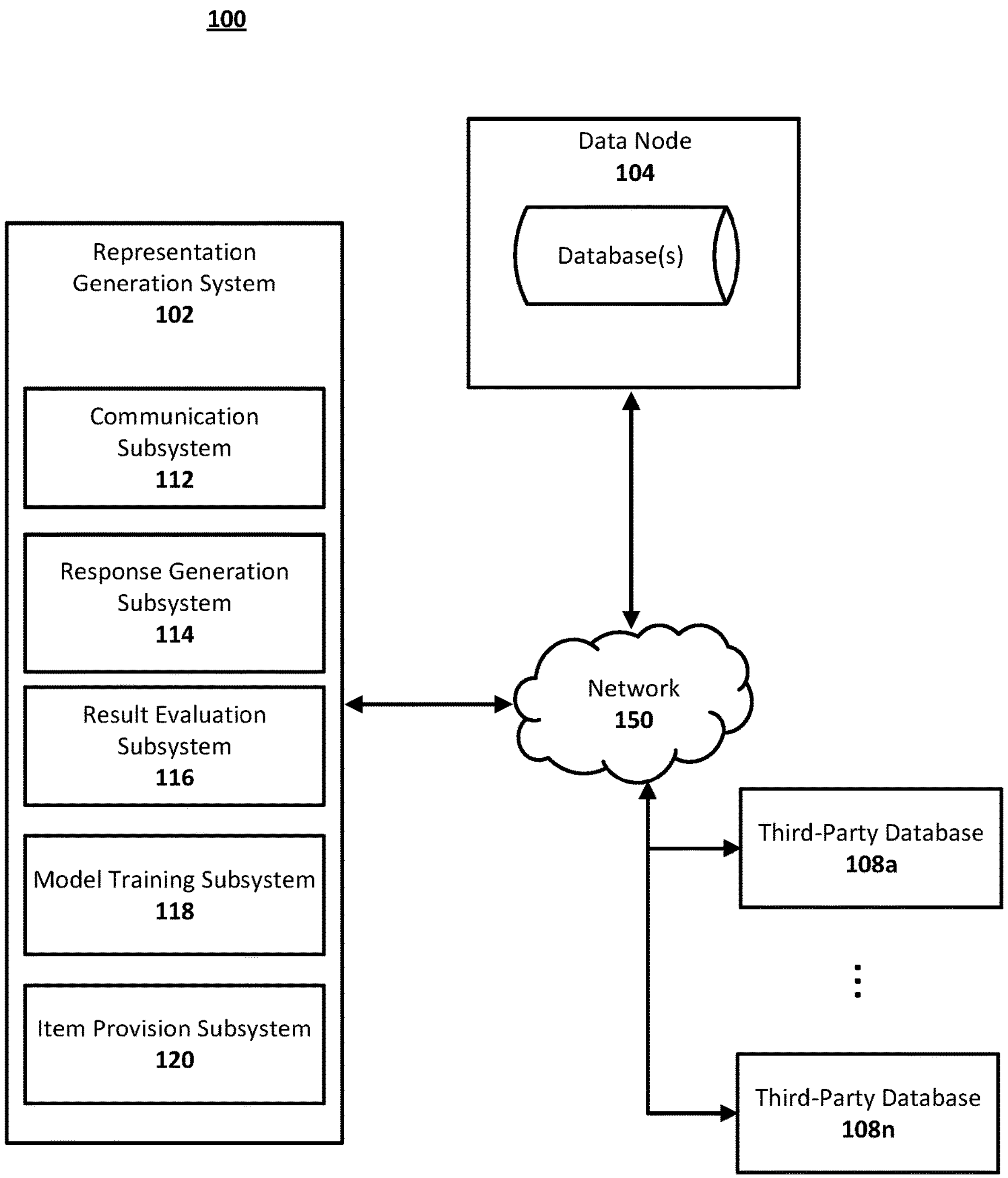
FIG. 1 shows an illustrative environment for generating user-specific textual descriptions and images based on user queries, in accordance with one or more embodiments of this disclosure.

FIG. 1 shows an illustrative environment 100 for generating user-specific textual descriptions and images based on user queries, in accordance with one or more embodiments of this disclosure. Environment 100 may include representation generation system 102, data node 104, and one or more third-party databases 108*a*-108*n*, any of which may be configured to communicate through network 150. Representation generation system 102 may include software, hardware, or a combination of both, and may reside on a physical server or a virtual server running on a physical computer system. In some embodiments, representation generation system 102 may be configured on a user device (e.g., a laptop computer, smartphone, desktop computer, electronic tablet, or another suitable user device). Furthermore, representation generation system 102 may reside on a server or node or may interface with third-party databases 108*a*-108*n* either directly or indirectly.

In some embodiments, the disclosed system (e.g., representation generation system 102) may receive a query for an item from a user to obtain images and descriptions associated with these queries, on the basis of user profile information characterizing the user. For example, representation generation system 102 may generate images and descriptions (i) based on existing items that are consistent with the user query, but are modified to highlight or emphasize particular features that are determined to be consistent with user query, or (ii) that are personalized in response to the user query, for subsequent provision of representations of matching items that are consistent with the user's selection of a personalized image and description. By doing so, representation generation system 102 enables a user to request access to existing items on the basis of personalized results, thereby enabling provision of more accurate search results to the user and improving user engagement with the system accordingly.

Some embodiments involve generating personalized descriptions of desired items that focus on the items' queries that are most relevant to a given user. For example, the disclosed system (e.g., representation generation system 102) enables generation of representations of existing items, such as computing systems and associated hardware components, where these representations emphasize aspects of the items that are most relevant to the user and the user's query. Representation generation system 102 may generate or modify a textual description and synthetic image based on a user profile and a query from the user. The generated textual description and the synthetic image may include natural language tokens or aspects that emphasize particular features of an existing item that are determined to be consistent with features associated with the user profile and/or the query. Upon receiving a selection of this item from the user, representation generation system 102 enables provision of the item to the user. By doing so, representation generation system 102 enables provision of user-specific descriptions and image representations of existing items, such as computing systems, where such representations adapt to the features or aspects relevant to the user.

Some embodiments involve generating personalized item searches based on a user's query and other information associated with the user. For example, representation generation system 102 may generate an improved selection of existing items based on a user's query and metadata associated with the user. Representation generation system 102 may generate multiple synthetic outputs and images corresponding to a user's query and user data associated with the user, such as a user profile. These synthetic outputs and inputs may not directly correspond to existing items. As an illustrative example, representation generation system 102 may generate a set of images and corresponding descriptions that are representative of the user's query, such as a set of images showing a computing system with features or characteristics identified by the user within the query or associated with the user's profile. Based on these multiple outputs, representation generation system 102 may match existing items to these personalized textual descriptions of items, thereby enabling a user to select a desired graphical representation of an item on a user interface for access to items that may satisfy the user's query. By doing so, representation generation system 102 may present a user with existing items similar to a desired item, thereby improving the relevance of the results shown to the user, as well as user engagement with the system. For example, by generating synthetic descriptions and images associated with personalized items that match the user's query, representation generation system 102 enables the user to specify preferences with a greater level of detail. Based on the user's selection, the system may select an item for provision to the user that more accurately reflects the requested item. By doing so, the system enables generation of user-specific results for the user.

These processes may be used individually or in conjunction with each other and with any other processes for facilitating utilization of stochastic images for use of tokens.

Data node 104 may store various data, including one or more machine learning models (e.g., model weights associated with an LLM, a generative language model, a prompt-based image generator, etc.), semantic data (e.g., text files, representations of sentences, queries, and descriptions, etc.), images (e.g., image files of generated images, received images, or images corresponding to existing items), training data (e.g., training text files, training user selections, training images, or other training data for training machine learning models), or other suitable data.

Data node 104 may include software, hardware, or a combination of the two. In some embodiments, representation generation system 102 and data node 104 may reside on the same hardware or the same virtual server or computing device. Network 150 may be a local area network (LAN), a wide area network (WAN) (e.g., the internet), or a combination of the two. Third-party databases 108*a*-108*n* may reside on client devices (e.g., desktop computers, laptops, electronic tablets, smartphones, servers, or other computing devices that interact with network 150, cloud devices, or servers).

As shown in FIG. 1, representation generation system 102 may be associated with or may include various subsystems, including communication subsystem 112, response generation subsystem 114, result evaluation subsystem 116, model training subsystem 118, and/or item provision subsystem 120. Representation generation system 102 may receive text files, textual descriptions, query images, user profiles, user data, item descriptions, or other suitable information from one or more devices. Representation generation system 102 may receive such data using communication subsystem 112, which may include software components, hardware components, or a combination of both. For example, communication subsystem 112 may include a network card (e.g., a wireless network card or a wired network card) that is associated with software to drive the card and enables communication with network 150. In some embodiments, communication subsystem 112 may also receive data from or communicate with data node 104 or another computing device. Communication subsystem 112 may receive data, such as text files, textual descriptions, queries, query images, item descriptions, graphical indications or representations of data, or other suitable data. Communication subsystem 112 may communicate with response generation subsystem 114, result evaluation subsystem 116, model training subsystem 118, item provision subsystem 120, data node 104, or any devices, modules, or entities communicably connected to network 150.

In some embodiments, representation generation system 102 may include response generation subsystem 114. Response generation subsystem 114 may perform tasks that generate content, such as text or images, based on prompts, such as text files, audio files, or image files (e.g., query images or query text). For example, response generation subsystem 114 may generate textual descriptions of items (e.g., existing items or synthetically) based on an input description or query for a requested item, such as through use of an LLM for natural language generation (e.g., a generative language model. In some embodiments, response generation subsystem 114 may generate images based on an input description, or may modify input images (e.g., query images) based on a textual prompt, such as through an image generation machine learning model. In some embodiments, a machine learning model associated with response generation subsystem 114 may generate textual descriptions and corresponding images based on the same input query and/or query image. Response generation subsystem 114 may include software components, hardware components, or a combination of both. For example, response generation subsystem 114 may include software components, or may include one or more hardware components (e.g., processors) that are able to execute operations for generating textual descriptions or images based on a user's previous queries, the user's current query, and/or item descriptions that match the user's query. Response generation subsystem 114 may access data, such as text files, textual descriptions, item descriptions, user selections of graphical indications, query images, generated images, prompts, or other information, such as information stored on data node 104. Response generation subsystem 114 may directly or indirectly access data, systems, or nodes associated with third-party databases 108*a*-108*n* and may transmit data to such systems. In some embodiments, response generation subsystem 114 may receive data from or send data to communication subsystem 112, result evaluation subsystem 116, model training subsystem 118, item provision subsystem 120, data node 104, or any devices communicably connected to network 150.

Result evaluation subsystem 116 may execute tasks relating to processing or evaluation of responses or outputs generated from response generation subsystem 114, including evaluation of user selections of preferred graphical representations of generated results. Result evaluation subsystem 116 may include software components, hardware components, or a combination of both. For example, result evaluation subsystem 116 may receive or obtain an output text and corresponding synthetic image associated with a user's query and corresponding user profile, and generate a graphical representation of this result for further processing. As an illustrative example, result evaluation subsystem 116 may determine whether the generated output text and synthetic image are consistent with features or aspects of the user's query. In some embodiments, result evaluation subsystem 116 may receive selections of graphical representations of machine learning model results for provision of the selected item to the user. Result evaluation subsystem 116 may access data, such as output images and corresponding images, training data, user selections, or other suitable information. Result evaluation subsystem 116 may directly access data, systems, or nodes associated with third-party databases 108*a*-108*n* and may be able to transmit data to such nodes (e.g., to obtain information relating to a user's previous queries). Result evaluation subsystem 116 may receive data from or transmit data to other systems or subsystems within environment 100, such as communication subsystem 112, response generation subsystem 114, model training subsystem 118, item provision subsystem 120, data node 104, or any devices communicably connected to network 150.

Model training subsystem 118 may execute tasks associated with training machine learning models (e.g., models associated with response generation subsystem 114). For example, model training subsystem 118 may generate training data for generating textual descriptions and corresponding images of existing items (and/or synthetic representations of items that may or may not exist), based on user selections or other user data associated with generated outputs. As such, model training subsystem 118 may include software components, such as application programming interface (API) calls, hardware components, or a combination of both. Model training subsystem 118 may receive (e.g., from response generation subsystem 114), outputs associated with the machine learning models (e.g., and/or associated LLMs or image generation models), including model weights or model architectures. For example, model training subsystem 118 may transmit training data to models associated with response generation subsystem 114 for training or updating the models. In some embodiments, model training subsystem 118 may receive data from network 150, data node 104, or third-party databases 108*a*-108*n*. Model training subsystem 118 may communicate with other components of environment 100, such as communication subsystem 112, response generation subsystem 114, result evaluation subsystem 116, or item provision subsystem 120.

Item provision subsystem 120 may execute tasks associated with providing items to users. For example, item provision subsystem 120 may provide items to users based on user selections of corresponding graphical representations of existing items. As such, item provision subsystem 120 may include software components, hardware components, or a combination of both. For example, item provision subsystem 120 may access or utilize third-party databases, such as item description databases, to provide access to resources that are not within representation generation system 102. In some embodiments, item provision subsystem 120 may access, modify, or interact with user credential or authentication systems associated with third-party databases 108*a*-108*n* to enable a user's access to requested items. Item provision subsystem 120 may communicate with other components of environment 100, such as communication subsystem 112, response generation subsystem 114, result evaluation subsystem 116, model training subsystem 118, data node 104, or any devices communicably connected to network 150.

FIG. 2 shows an illustrative schematic of a user activity log including previous user queries, in accordance with one or more embodiments. For example, data structure 200 may include user activity log 202, associated with a user with user identifier 204, which may include information relating to previous queries generated by the user (e.g., item queries 208), as well as corresponding timestamps 206. For example, user activity log 202 may be associated with a user activity database, including user activity logs associated with a variety of other users. By accessing information associated with users, such as a user's previous activity, or other attributes associated with the user, representation generation system 102 may generate improved recommendations and results in response to user queries.

In some embodiments, representation generation system 102 may receive a query that includes a textual description. For example, representation generation system 102 may receive, from a user, a first query including a textual description. As an illustrative example, communication subsystem 112 may receive a query for a particular item or product, such as a query for a house that is available for sale or for rent. A query may include a prompt or an indication of a requested item, entity, or concept. For example, a query may include a natural language-based (e.g., textual) description of a requested item, such as a computing device, a house, or a type of credit card requested by the user. In some embodiments, this item may include financial instruments, such as a loan or a credit card. For example, a user may specify, within the query, a location, a type of house, or features associated with the requested house using natural language tokens (e.g., words, phrases or sentences) within a text string. The query may include non-text elements, such as images (e.g., as in an image query), audio, or other content. For example, communication subsystem 112 may receive an image of an existing house, or an illustration of a personalized house, as a prompt or query from the user. The query image may include an image file (e.g., of a standardized format, such as in a Portable Network Graphics (PNG) format, or a Joint Photographic Experts Group (JPEG) format) that represents a query or a prompt associated with the user. In some embodiments, the user may submit this query through a text box or a text field associated with a GUI. By receiving such information, representation generation system 102 may generate results that are relevant to the user's query.

In some embodiments, representation generation system 102 may retrieve a user profile for the user. For example, representation generation system 102, using communication subsystem 112 and third-party databases 108*a*-108*n*, may retrieve, using a user identifier associated with the user, a user profile for the user. The user profile may include user data including a plurality of queries associated with the user identifier. As an illustrative example, representation generation system 102 may identify a user identifier associated with the user submitting the query. Based on this user identifier, representation generation system 102 may query user activity databases (e.g., those associated with third-party databases 108*a*-108*n*) to determine user metadata associated with the user, such as previous user queries, as well as information characterizing the user. For example, as shown in FIG. 1, a user activity log corresponding to user identifier 204 may include item queries 208 associated with the user, which may be related to the item's current query (e.g., may be real estate-related). By retrieving information associated with the user, representation generation system 102 enables personalized results associated with the user's query based on this user information.

In some embodiments, representation generation system 102 may obtain user information, such as user metadata, associated with data node 104, through user activity log 202. For example, representation generation system 102 may obtain, from a user activity database, a user activity log (e.g., user activity log 202) corresponding to the user. Representation generation system 102 may obtain a plurality of user queries (e.g., item queries 208). Representation generation system 102 may obtain (e.g., through communication subsystem 112) user metadata corresponding to the user. In some embodiments, the user metadata includes demographic information associated with the user. As an illustrative example, representation generation system 102 may include information relating to the user, such as previous search queries requested by the user, as well as information relating to the user's credentials, user account, or other user-related data. By retrieving such data, representation generation system 102 may generate personalized results associated with the user query, thereby improving the accuracy and relevance of the results to the user.

A user identifier may include an identifier or marker of a user submitting a query. For example, a user identifier may include a username, identifying information (e.g., a name, date of birth, or identification number, such as a social security number), an account number, an internet protocol (IP) address, or other information that may be used to identify a user indirectly or directly. By determining a user identifier associated with the query, representation generation system 102 may retrieve further information related to the user (e.g., user metadata, user data, or other information within the user profile) that may be associated with the user and may improve the quality of responses presented to the user in response to the user's query.

A user profile may include a set of information associated with a user. For example, a user profile may include historical information relating to the user's activities, such as previous queries associated with the user. In some embodiments, a user profile may include other information characterizing the user, such as an account type (e.g., administrator or a user), an account age, an account status, or other information relating to the user. For example, a user profile may indicate user metadata, such as information relating to services or features accessed by the user (e.g., previous purchases or search results associated with the user). In some embodiments, user metadata and/or user data may include information relating to a user's financial health, such as a credit report, credit score, or information relating to approved or denied financial instruments (e.g., credit cards or loans). In some embodiments, the user profile may include demographic information (e.g., within the user metadata), such as information relating to the user's age. By retrieving such information associated with the user, representation generation system 102 may provide results that are more consistent or relevant to the user; for example, representation generation system 102 may generate and/or enable displaying of results that are likely relevant to the user's preferences or financial means, thereby improving user engagement with the system.

In some embodiments, the user profile may include information associated with previous queries. For example, the user profile may include a user activity log associated with the user. A user activity log may include previous queries or activities carried out by the user (e.g., as identified with a given user identifier). For example, the user activity log may include timestamps (e.g., timestamps 206), as well as corresponding item queries associated with other user searches or requests for information. By receiving a user activity log, representation generation system 102 may evaluate features or items that have been of interest to the user for a long time. In some embodiments, representation generation system 102 may track trends in a user's activity (e.g., trends in features or items requested by the user over various item queries over time) and predict features or items that are of interest to the user. As such, by obtaining a user profile that includes an activity log, representation generation system 102 may improve the quality and accuracy of generated results for the user, thereby improving the likelihood of user engagement with the system.

FIG. 3 shows an illustrative schematic of an item description database associated with existing items relevant to the user query, in accordance with one or more embodiments. For example, data structure 300 may include item description database 302 (e.g., an item database) associated with existing items. For example, item description database 302 may include item identifiers 304, as well as item attributes 306 corresponding to items associated with item identifiers 304. For example, item attributes 306 may include item styles 308*a*, item locations 308*b*, and/or item features 308*c*. An item description database may include information associated with existing items, including characteristics, attributes, and values associated with such items. Item description database 302, as such, may provide information relating to existing items that may be relevant to a user's query. Thus, representation generation system 102 may generate information relating to items that may be relevant to the user, thereby improving the quality of search results presented to the user in response to the user's query.

In some embodiments, representation generation system 102 (e.g., through communication subsystem 112) may obtain a description of an item based on the query. For example, representation generation system 102 may obtain, based on the first query, a first description of a first item. As an illustrative example, representation generation system 102 may identify existing items that match features, characteristics, or attributes of items described within the user's query. For example, representation generation system 102 may determine one or more houses that are similar to a house described within the user's query. In some embodiments, the description (e.g., a textual and/or an image-based description) may include an indication of features associated with the house. For example, the description may include an image of the corresponding house. By retrieving such information, representation generation system 102 may subsequently modify, evaluate, or process the description for provision to the user in response to the query.

An item may include any product, system, property, or other entity. For example, an item may include a physical object or entity, such as a property (e.g., a house, apartment, or other property associated with a user) or a computing system (e.g., hardware). In some embodiments, an item may include intangible entities, such as lines of credit or other financial products, and/or software. For example, an item description may include a textual, image-based, or other representation of an existing item. For example, an item description may include an indication of attributes associated with the item, such as item attributes 306 shown in FIG. 3. An item description may include a written textual description of an item written in prose. In some embodiments, an item description may include a list or set of natural language tokens (e.g., words, phrases, or sentences) associated with the item, such as a list of words describing features of the given item.

As an illustrative example, item attributes 306 may include a data structure indicating an item's identifier (e.g., an alphanumeric identifier, such as a stock keeping unit (SKU)), a style, a location, and features associated with the data structure. Item attributes 306 may include information associated with a financial instrument, such as a line of credit (e.g., interest rates, qualification rules, or other information relating to a credit card). Item attributes 306 may include information relating to a computing device or any other item. In some embodiments, an item description may include one or more images associated with the item, such as pictures of a corresponding property (e.g., external or interior pictures of the house). For example, an image of the house may capture or describe a subset of features associated with the house, such as a door or a backyard. By retrieving item descriptions associated with existing items, representation generation system 102 may provide results associated with a user's query associated with existing items, such that provided results may be accurate and relevant to the user. For example, in some embodiments, representation generation system 102 (e.g., through result evaluation subsystem 116) may determine one or more item descriptions that match with a user query and/or a user's selection of a result (e.g., a matching item description), as described below.

In some embodiments, representation generation system 102 may obtain a description of the item based on matching a user's requested characteristics with characteristics of an existing item. For example, representation generation system 102 may determine, based on the first query, a plurality of requested characteristics describing a requested item. Representation generation system 102 (e.g., through communication subsystem 112) may obtain a plurality of characteristic sets. Each characteristic set of the plurality of characteristic sets may include a corresponding plurality of item characteristics associated with a corresponding item. Representation generation system 102 (e.g., through result evaluation subsystem 116) may compare each characteristic set of the plurality of characteristic sets with the plurality of requested characteristics. Based on comparing each characteristic set of the plurality of characteristic sets with the plurality of requested characteristics, representation generation system 102 may determine the first item. Representation generation system 102 (e.g., through communication subsystem 112) may retrieve, from an item database, the first description of the first item. As an illustrative example, representation generation system 102 may retrieve sets of attributes associated with different existing items (e.g., items within item description database 302). Based on matching attributes associated with the user query with attributes of existing items, representation generation system 102 may determine one or more items that are likely relevant to the user, thereby improving the accuracy of responses to user queries.

Requested characteristics may include features, attributes, or other characteristics of an item as requested within a user's query, for example. As an illustrative example, a user may request a "Cherry Hill house with water" through a user query-based on this query, representation generation system 102 may generate items with similar attributes, such as items associated with the location (e.g., "Cherry Hill"), the type of item (e.g., "house"), or features associated with the item (e.g., "water"). In some embodiments, a requested characteristic may include requested attributes associated with lines of credit, such as requested interest rates, payment terms, or other information associated with credit. Requested characteristics may include information relating to computing devices, such as features or specifications associated with hardware or software of a requested computing system. As an illustrative example, a requested characteristic may include natural language tokens, such as words, phrases, and sentences, that describe characteristics associated with the query. In some embodiments, requested characteristics may be associated with a query image provided by the user. For example, representation generation system 102 may utilize an image identification model (e.g., a corresponding artificial intelligence model) to determine requested characteristics based on a query image received from the user. For example, representation generation system 102 may identify features of the provided image to generate characteristics that the user desires based on the query. By determining such characteristics, representation generation system 102 enables user-specific evaluation of existing items to provide a relevant selection of items to the user in an accurate manner.

A characteristic set may include a set of characteristics associated with a given item (e.g., an existing item). For example, a characteristic set may include a set of attributes or characteristics (e.g., item attributes 306) associated with a given item (e.g., item characteristics). A characteristic set may include natural language tokens (e.g., words, phrases, or sentences) associated with a given item, such as an indication of an item type, an item value (e.g., a price), an item location, and features associated with the item. For example, a characteristic set may include a house style, a location of the house, and features associated with the house (e.g., a number of bedrooms and bathrooms, and any additional features of the house). In some embodiments, a characteristic set may include information associated with lines of credit, such as interest rates, payment terms, payment durations, or other information associated with particular loans or credit cards. In some embodiments, a characteristic set may include information associated with an existing computing system that a user may potentially access, such as information or specifications of associated technical features (e.g., hardware or software components). By comparing requested characteristics with characteristic sets associated with existing items, representation generation system 102 enables generation of accurate and relevant results for the user in response to a user's query.

In some embodiments, representation generation system 102 (e.g., through result evaluation subsystem 116) may compare characteristic sets with requested characteristics by generating corresponding similarity metrics. For example, representation generation system 102 may generate a plurality of similarity metrics. In some embodiments, each similarity metric of the plurality of similarity metrics indicates a similarity between a requested characteristic of the plurality of requested characteristics and a corresponding characteristic set, for a corresponding item, of the plurality of characteristic sets. Representation generation system 102 may determine that a first similarity metric of the plurality of similarity metrics meets a threshold similarity metric. Representation generation system 102 may determine the first item. In some embodiments, the first item corresponds to the first similarity metric. As an illustrative example, representation generation system 102 may determine a quantitative (or qualitative, in some embodiments) indication of similarity between an available item (e.g., a house) and an item requested by the user through the user's query. For example, result evaluation subsystem 116 may determine whether a given item of the item description database is similar to an image or text representing the user query. For example, result evaluation subsystem 116 may determine a proportion or a percentage of attributes or requested characteristics associated with the user query that are reflected in a given item of the item database. For example, a listed house may include a subset of features requested by the user (e.g., a swimming pool, but no water feature, such as a lake); accordingly, result evaluation subsystem 116 may determine that the listed house has a relatively low similarity metric with respect to the item requested by the user. By doing so, representation generation system 102 may evaluate the similarity of an item with the user's query, thereby enabling provision of accurate and relevant items to the user that accurately reflect the user's desires.

A similarity metric may include a measure of similarity between items, concepts, or characteristics. As an illustrative example, a similarity metric may include a metric, score, or value indicating similarity between two characteristics, between two characteristic sets, or between a characteristic and a characteristic set (e.g., between a first characteristic of the plurality of requested characteristics and a second characteristic of a characteristic set). Result evaluation subsystem 116 may determine a similarity between a particular characteristic (e.g., a feature or an attribute) associated with the query and one or more characteristics with an existing item. For example, result evaluation subsystem 116 may determine that the query is associated with a house with a requested characteristic, such as a "water feature," and may determine that a particular item includes an indication of a "lake." Result evaluation subsystem 116 may compare the item with the requested characteristic in order to determine a similarity metric. In some embodiments, result evaluation subsystem 116 may generate vector embeddings of the item description and/or the requested characteristic or query. Based on these vector embeddings, result evaluation subsystem 116 may determine a similarity metric using a similarity algorithm (e.g., to determine a cosine similarity between the two vector embeddings). In some embodiments, result evaluation subsystem 116 may compare the similarity metric with a threshold similarity metric (e.g., pre-determined, or determined based on the query) to determine an item description to retrieve from the item description database. In some embodiments, result evaluation subsystem 116 may determine a subset of item descriptions corresponding to a subset of items based on comparing similarity metrics with the threshold similarity metric, where the similarity metrics indicate a similarity between characteristic sets associated with a synthetic item (e.g., an item with a synthetic output and/or image) and existing items (e.g., with matching item descriptions). By doing so, result evaluation subsystem 116 enables evaluation of the similarity between existing items and a requested item within a user query, thereby improving the accuracy of results shown to the user in response to the query.

Systems and Methods for Modification of Machine Learning Model-Generated Text and Images Based on User Queries and Profiles Representation generation system 102 enables generation of personalized descriptions of desired items based on a user's query, and any information associated with the user (e.g., information discussed above relating the user query system). For example, representation generation system 102 may determine existing items that match with a user's query. Based on these existing items, representation generation system 102 may generate images and descriptions that emphasize features of these existing items that are consistent with the user's query. By doing so, representation generation system 102 enables generation of personalized search results to user queries, where such results are relevant to the user and emphasize any desired characteristics or features. As such, representation generation system 102 enhances user engagement by improving the relevance of results presented to the user.

Figure 4:
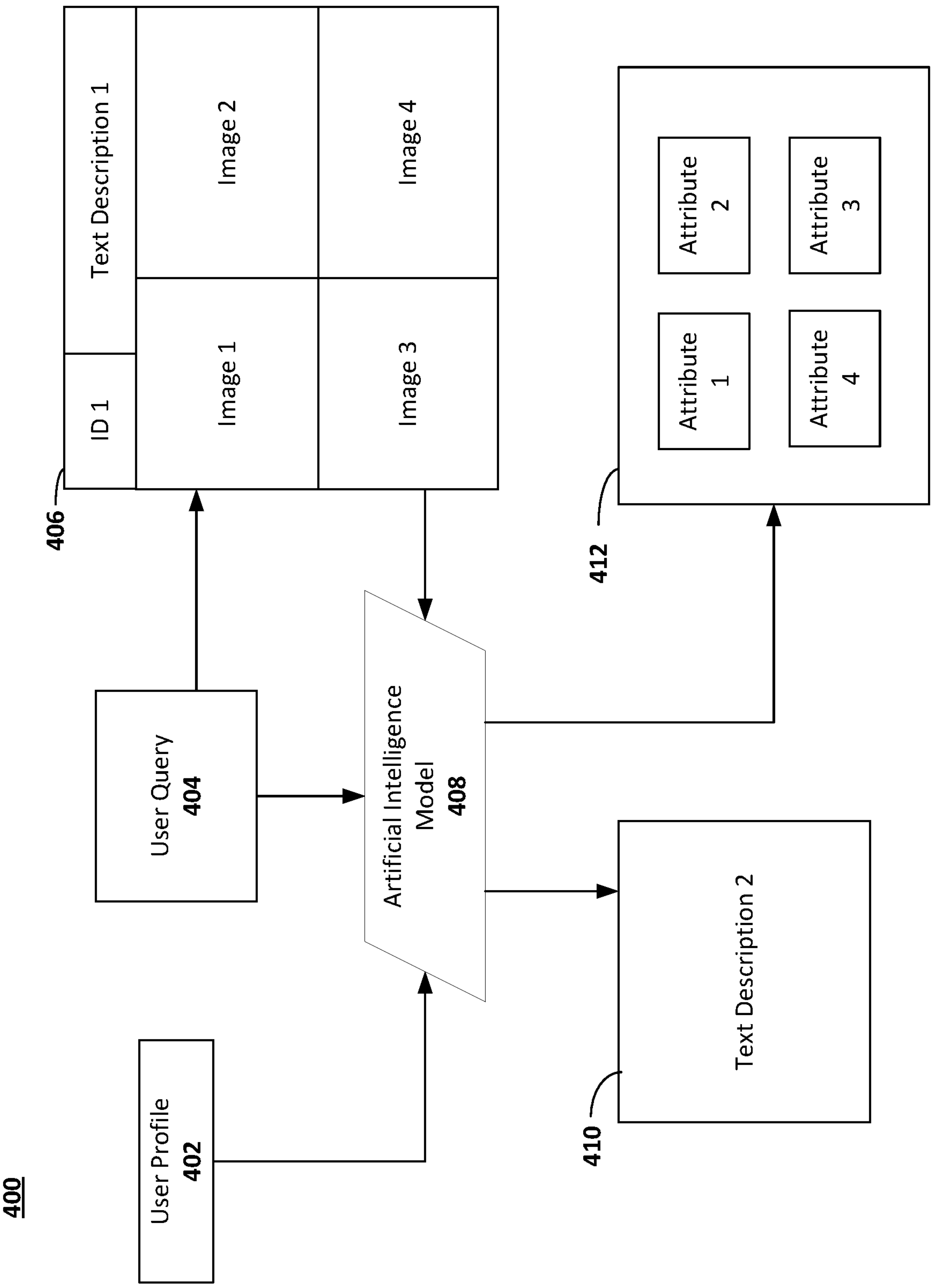
FIG. 4 shows an illustrative schematic for a process for generating personalized graphical representations of existing items, in accordance with one or more embodiments.

FIG. 4 shows an illustrative schematic for a process for generating personalized graphical representations of existing items, in accordance with one or more embodiments. For example, flow 400 enables representation generation system 102 to receive user query 404 for a requested item. In some embodiments, representation generation system 102 may determine user profile 402 associated with the user query. Based on the user query, representation generation system 102 may determine an item associated with the user query, where the item is associated with item description 406. Representation generation system 102 may utilize artificial intelligence model 408 to generate natural language output 410 and synthetic image 412, for further display and selection by the user. By doing so, representation generation system 102 enables user selections of items that are accurate and relevant to the user's query, where the items emphasize features that are determined to be important to the user based on the user's previous queries. As such, representation generation system 102 enables provision of items to users that are more desirable to users based on these emphasized features.

In some embodiments, representation generation system 102 (e.g., through response generation subsystem 114) may generate an output and an image using a machine learning model based on the user profile, the query, and the item description. For example, representation generation system 102 may provide the user profile, the first query, and the first description to a machine learning model to cause the machine learning model to generate a first output and a first image. In some embodiments, the first output includes an indication of a plurality of features corresponding to the first description and the user profile. In some embodiments, characteristics of the first image correspond to the plurality of features. As an illustrative example, representation generation system 102 may generate, using artificial intelligence model 408, a description associated with the first description (e.g., associated with item description 406), where properties, attributes, characteristics, or features are emphasized according to the user profile and/or the user query. For example, in response to a user query requesting results associated with a house with "water," representation generation system 102 may generate natural language output 410 to include, highlight, or emphasize water features associated with the item corresponding to item description 406. In some embodiments, artificial intelligence model 408 may generate a corresponding synthetic image based on item description 406, where the synthetic image emphasizes such features (or different features) in a similar manner. By doing so, representation generation system 102 enables generation of representations of existing items that may be relevant to a user and the user's query, while emphasizing features that are likely to be desirable to the user, thereby improving the quality of search results.

A machine learning model may include one or more algorithms for generating images, natural language outputs, or other outputs. For example, a machine learning model may include an LLM (e.g., artificial intelligence model) for generation of text outputs based on the user query, user profile, and/or an item description. For example, an LLM may generate natural language output 410 based on user profile 402, user query 404, and item description 406. An LLM may include an artificial neural network (or any other artificial intelligence or machine learning model) that enables generation of text. For example, an applicable machine learning model may include model weights, neurons, model parameters, activation functions, or other attributes associated with machine learning models. In some embodiments, an LLM may include a transformer architecture or any suitable architecture.

A machine learning model may include a text-to-image model (e.g., an image generator, or an artificial intelligence art model). For example, a text-to-image model may include a model that receives, as input, a natural language description and generates an image corresponding to the description. In some embodiments, response generation subsystem 114 may include an image generation model capable of accepting images (e.g., query images) as inputs (or other suitable types of inputs, such as audio), for generation of images. For example, the image generation model may accept, as input, an output generated by an LLM based on user query 404, user profile 402, and/or item description 406. As such, the machine learning model may generate new images from textual prompts, and/or modify existing images. The machine learning model may include multiple machine learning algorithms or models in series or in parallel for generation of one or more outputs of various formats. The machine learning model enables users to generate user-specific results, where particular features or characteristics of an existing item of interest are highlighted semantically or visually to the user. In some embodiments, the machine learning model may generate synthetic images that do not correspond to existing items, but may reflect a desired item requested by the user. As such, representation generation system 102 enables users to fine-tune their search query and provide information that is likely engaging or important to the user, for further evaluation of which items to suggest to the user.

An output may include a representation of an item, a user's query, or an associated entity. For example, an output may include a natural language output (e.g., a series of natural language tokens, including words, phrases or sentences), an image, audio, or other output, such as from an LLM or another generative machine learning model. For example, the output may be in response to a prompt (e.g., a user query) or other inputs, including a user profile (e.g., information associated with a user and/or previous queries by the user), and existing items. An output may include a textual description of a house that may include tokens indicating features or characteristics specified within the user query, such as "water features" associated with houses. In some embodiments, the output may include tokens associated with an existing item (e.g., describing characteristics associated with the existing item of an item description database).

A synthetic image may include an image representation of an input. For example, a synthetic image may include an illustration or visual representation associated with a prompt or other input. A synthetic image may include an output from an image generation model. The synthetic image may include a file of an image file format (e.g., a PNG or JPEG file), and may include pixels or other data enabling a visual representation of information. For example, a synthetic image may be associated with a user query and a user profile and may correspond to a description or natural language output (e.g., as generated from an LLM). In some embodiments, the synthetic image may be associated with characteristics that correspond to a plurality of features indicated by the first output. In some embodiments, the synthetic image may be associated with an existing item; for example, the synthetic image may include a modification of an existing image associated with an existing item of an item description database, where the modification emphasizes or highlights features associated with the user profile or the user query. As such, the synthetic image may enhance or improve the relevance of results in response to the user query by highlighting or focusing on features of interest to the user.

Characteristics (e.g., of a synthetic image or of an output from the machine learning model) may include features, attributes, or other elements associated with data, a query, or outputs. For example, characteristics may include descriptors (e.g., adjectives, colors, or modifiers) associated with the user query, or may include elements (e.g., other nouns representing features, objects, or items). For example, a house (e.g., as indicated within a user query or a corresponding natural language output or synthetic image) may include characteristics or features including descriptors (e.g., "big," "Victorian-style," or "open-concept") or may include elements (e.g., a "swimming pool," a "lake" or a "foyer"). Such elements may be associated with descriptors. In some embodiments, the characteristics or features may include descriptors of computing systems and/or financial instruments, such as descriptors or of computing devices (including associated hardware or software modules) or lines of credit. By identifying and evaluating characteristics and features associated with a user query, output, or existing item, representation generation system 102 enables generation of accurate, relevant search results with respect to a user's query, thereby improving the efficiency of user searches.

In some embodiments, representation generation system 102 (e.g., through result evaluation subsystem 116) may generate another synthetic image and output if characteristics associated with the image are inconsistent with the user query and/or the existing item. For example, representation generation system 102 may obtain a first characteristic set corresponding to the first item. In some embodiments, the first characteristic set may include characteristics describing the first item. Representation generation system 102 may determine whether the characteristics of the first image correspond to the first characteristic set. Based on determining that a first characteristic of the first image does not correspond to the first characteristic set, representation generation system 102 may provide the user data, the first query, and the first description to the machine learning model to generate a second image distinct from the first image.

As an illustrative example, representation generation system 102 may determine that characteristics associated with the first item are inconsistent with characteristics of the generated synthetic image (e.g., the first image). For example, result evaluation subsystem 116 may determine that the image includes an indication or illustration of a house within a desert, where the item is consistent with a house with a water feature. Additionally or alternatively, representation generation system 102 may determine that features or elements associated with a requested computing system or line of credit (e.g., a credit card, a loan) are not consistent with features or elements of the existing item. As such, representation generation system 102 may determine to re-generate the image to resolve this inconsistency, thereby improving the accuracy of results presented to the user.

In some embodiments, representation generation system 102 (e.g., through result evaluation subsystem 116) may generate the output (e.g., the natural language output) to include semantic tokens associated with the item description and user data. For example, representation generation system 102 may generate, via the machine learning model, a plurality of semantic tokens corresponding to the first description and the user data. In some embodiments, the plurality of semantic tokens includes words, phrases, or sentences associated with the first description. Representation generation system 102 may generate a first feature of the plurality of features to include a first semantic token of the plurality of semantic tokens. As an illustrative example, representation generation system 102 may generate the natural language output to include semantic tokens (e.g., words, phrases, or sentences, in a text string or character variable type or format). For example, a semantic token may include words, phrases, sentences, or other tokens that exhibit semantic, lexical, or syntactic value. Representation generation system 102 (e.g., through result evaluation subsystem 116) may determine that a generated semantic token corresponds to a feature associated with the output (e.g., if a semantic token specifies a descriptor or an element) and generate the plurality of features associated with the output to include this semantic token corresponding to this feature. As such, representation generation system 102 enables determination of features associated with the natural language output (e.g., from the LLM), thereby improving the ability of the system to evaluate the output for compatibility with the user's query.

In some embodiments, representation generation system 102 (e.g., through communication subsystem 112) may generate a graphical representation of the item. For example, communication subsystem 112 may generate the first graphical representation of the first item. In some embodiments, the first graphical representation of the first item includes the first image and a representation of the first output. As an illustrative example, communication subsystem 112 may generate a GUI that includes an element (e.g., a tile) that exhibits the natural language output (e.g., a textual description associated with the item, from the machine learning model) and the synthetic image (e.g., the first image, as generated by the image generation model). For example, the GUI may include an image of a house with a water feature, as associated with the item and corresponding first description of the item. The GUI may include a set of user controls that enables user selection of the graphical representation (e.g., the element, such as the tile). As such, representation generation system 102 enables display of relevant results to the user in response to the user's query, thereby enabling representation generation system 102 to satisfy user searches for items in a user-specific manner. By generating an image in addition to a textual description, representation generation system 102 may provide the user with more descriptive results than with only images or textual descriptions.

The graphical representation (e.g., a graphical indication) may include a representation of the image and/or natural language output generated by the machine learning model. For example, the graphical representation may include a tile or another portion of a GUI (e.g., a link, a thumbnail, or another representation) that includes an indication of the generated results. For example, the GUI may include the synthetic image and the textual description generated by the LLM in response to the user query, or a modified textual description. As such, the graphical representation displayed to the user may be personalized or tailored to the user on the basis of features associated with the user query, as well as the user profile. In some embodiments, the graphical representation represents an existing item (e.g., as described within an item description database). As such, by generating a graphical representation, representation generation system 102 enables provision of search results to a user, where such search results may emphasize features or attributes that are relevant to the user, while still being consistent with the item being described.

In some embodiments, representation generation system 102 may generate a ranked list of multiple graphical representations of items based on how similar such items are to the query (e.g., requested characteristics). For example, representation generation system 102 (e.g., through result evaluation subsystem 116) may determine a subset of similarity metrics of the plurality of similarity metrics. In some embodiments, each similarity metric of the subset of similarity metrics meets the threshold similarity metric. Representation generation system 102 may generate a ranked list of graphical representations of items, where the ranked list of graphical representations includes the first graphical representation of the first item. The graphical representations may be ranked according to the plurality of similarity metrics. As an illustrative example, representation generation system 102 may determine multiple items that are consistent with the user query (e.g., consistent with attributes or characteristics associated with the user query) through comparison of corresponding similarity metrics with requested characteristics associated with the user query. Representation generation system 102, through communication subsystem 112, may display graphical representations of this subset of consistent items in a ranked order, thereby prioritizing existing items that are more likely to be associated with or relevant to the user or the user's query. As such, representation generation system 102 enables improved analytics with respect to search results in a user-tailored manner, thereby improving the accuracy of search results presented to the user.

In some embodiments, representation generation system 102 (e.g., through communication subsystem 112) may receive a selection of the graphical representation from the user. For example, representation generation system 102 may receive a selection of the first graphical representation of the first item. As an illustrative example, representation generation system 102 may receive a click, interaction, or a form of confirmation from the user that a particular graphical representation corresponding to a particular item is desired. For example, the user may select a tile on a touch-screen GUI using a hand-based gesture, where the tile corresponds to a graphical representation of an existing listing of a house that has been modified to highlight features or attributes associated with the user query and/or the user profile. As such, representation generation system 102 receives feedback from the user regarding a desired item in response to the user query, thereby enabling representation generation system 102 to further provide access to such an item or improve suggestions accordingly.

In some embodiments, representation generation system 102 may update the user profile to improve predictions of outputs for the machine learning model. For example, representation generation system 102 may generate, based on the selection of the first graphical representation of the first item, user metadata that includes the first image and the representation of the first output. Representation generation system 102 may generate, for the user, an updated user profile that includes the user metadata. Representation generation system 102 may provide the updated user profile to the machine learning model to cause the machine learning model to generate updated images and updated outputs. As an illustrative example, representation generation system 102 may utilize the user selection of the graphical representation corresponding to an item to add to the user profile, thereby improving information associated with the user. As such, representation generation system 102 enables generation of updated, improved results for the user in response to further queries.

In some embodiments, representation generation system 102 (e.g., through model training subsystem 118) may train the machine learning model (e.g., an associated LLM and/or an associated image generation model) based on the user's selection. For example, representation generation system 102 may generate, based on the selection of the first graphical representation of the first item, training data that includes the first image, the representation of the first output, and the user profile. Representation generation system 102 may provide the training data to the machine learning model to train the machine learning model to generate images and outputs based on input user profiles. As an illustrative example, representation generation system 102 may generate a data structure corresponding to training data that includes an indication of the user's selection, as well as other information relating to the user and the user query (e.g., the user profile and/or the existing item associated with the user's selection, and any associated features/characteristics). Based on this information, representation generation system 102 may train the machine learning model or components thereof (e.g., update any associated model parameters or model weights), thereby improving the ability of the machine learning model to generate images and/or natural language outputs in response to user queries.

In some embodiments, representation generation system 102 (e.g., through item provision subsystem 120) may enable a user's access to the item in response to the user's selection (or otherwise). For example, based on receiving the selection of the first graphical representation of the first item, representation generation system 102 may enable access to the first item. As an illustrative example, item provision subsystem 120 may enable access to a resource, item, or object associated with a given graphical representation. For example, where representation generation system 102 receives an indication that the user selected a graphical representation corresponding to a particular house, representation generation system 102 may enable access to the house (e.g., by providing an address, or by providing a form for submitting an application to obtain the house). In some embodiments, item provision subsystem 120 may enable access to a particular computing device associated with the graphical representation (e.g., enable a user to schedule time associated with a physical computing device and/or schedule time to access this computing device virtually). In some embodiments, item provision subsystem 120 may enable a user's access to a line of credit (e.g., a credit card) associated with the graphical representation, or to an application (e.g., a credit application) for this line of credit. As such, representation generation system 102 enables provision of resources to a user according to a user selection, where results shown to the user are associated with features or attributes highlighted that are likely relevant to the user. Thus, representation generation system 102 may generate user engagement by improving the quality of search results presented to users.

In some embodiments, representation generation system 102 may generate another output based on another query received from the user. For example, representation generation system 102 may receive a second query from a user. Representation generation system 102 may obtain, based on the second query, a second description of a second item. Representation generation system 102 may provide the user profile, the second query, and the second description to the machine learning model to cause the machine learning model to generate a second output and a second image. As an illustrative example, representation generation system 102 may provide additional results in response to user queries, thereby enabling user control over the nature of results. For example, representation generation system 102 enables a user to modify, update, or improve a user query to specify further features or characteristics associated with a desired item or search result, thereby improving the quality of results presented to the user.

In some embodiments, representation generation system 102 may provide the user access to a second item based on this second query and corresponding results. For example, representation generation system 102 may generate, for display on a user interface, the first graphical representation of the first item and a second graphical representation of the second item.

Representation generation system 102 may receive a selection of the second graphical representation of the second item. Based on receiving the selection of the second graphical representation of the second item, representation generation system 102 may enable access to the second item. As an illustrative example, representation generation system 102 may provide access to the user of a different item other than the first item based on selection of another graphical representation of a second item. As such, representation generation system 102 may provide access to items based on a user's updated queries, thereby improving control of the user with respect to results presented to the user, as well as any items that are subsequently provided to the user.

In some embodiments, representation generation system 102 may generate another graphical representation of the first item based on another image or output associated with the first item (e.g., emphasizing other features or characteristics of the item). For example, representation generation system 102 (e.g., through response generation subsystem 114) may provide the user profile, the first query, and the first description to the machine learning model to cause the machine learning model to generate a second output and a second image. In some embodiments, the second output is distinct from the first output and the second image is distinct from the first image. Representation generation system 102 may generate a second graphical representation of the first item. In some embodiments, the second graphical representation of the first item includes the second image and a representation of the second output. Representation generation system 102 may receive a selection of the second graphical representation of the first item. Based on receiving the selection of the second graphical representation of the first item, representation generation system 102 (e.g., through item provision subsystem 120) may enable access to the first item. As an illustrative example, representation generation system 102 may generate an image and corresponding description (e.g., through an image generation model and/or an LLM) based on an existing item from the item description database with a different set of emphasized features or attributes (or where such features/attributes are emphasized to differing degrees). Based on these outputs, representation generation system 102 may generate a graphical representation that provides a different representation of the same item, and provide this to the user for the user's evaluation and selection. As such, representation generation system 102 enables flexible, dynamic emphases of characteristics of items for display to the user, thereby improving the personalization and robustness of results shown to the user.

In some embodiments, representation generation system 102 may receive a selection of another item that may be more desirable to the user. For example, representation generation system 102 may obtain, based on the first query, a second description of a second item. Representation generation system 102 may provide the user profile, the first query, and the second description to the machine learning model to cause the machine learning model to generate a second output and a second image. Representation generation system 102 may generate a second graphical representation of the second item. In some embodiments, the second graphical representation of the second item includes the second image and a representation of the second output.

Representation generation system 102 may receive a selection of the second graphical representation of the second item. Based on receiving the selection of the second graphical representation of the second item, representation generation system 102 may enable access to the second item. As an illustrative example, representation generation system 102 may generate another graphical representation that corresponds to another item (e.g., other than the first item) of the item description database. Instead of, or in addition to, selecting the first graphical representation, the user may select the second graphical representation representative of the second item (e.g., corresponding to another house, another computing device, or another line of credit that is desirable to the user). As such, representation generation system 102 enables provision of multiple graphical representations of multiple items to the user to enable the user to select multiple items (or, for example, a most desirable item of these multiple items), thereby improving user control over results in response to the user query.

In some embodiments, representation generation system 102 (e.g., through model training subsystem 118) may train data based on the user's selection of a second item (e.g., instead of or in addition to the first item). For example, representation generation system 102 may generate, based on the selection of the second graphical representation of the second item, training data that includes the second image, the representation of the second output, and the user profile. Representation generation system 102 may provide the training data to the machine learning model to train the machine learning model to generate images and outputs based on input user profiles. As an illustrative example, representation generation system 102 may record the user's selection of the graphical representation corresponding to the second item and train the machine learning model according to this selection. As such, representation generation system 102 enables improvements to the machine learning model based on user input, thereby improving the ability of representation generation system 102 to tailor results to preferences or profiles associated with users.

Systems and Methods for User Selection of Machine Learning Model-Based Results Based on User Queries and Profiles Representation generation system 102 may enable generation of personalized item searches on the basis of the user's query, and other information associated with the user (e.g., as determined using the user query system described above). For example, representation generation system 102 may generate a set of synthetic images and corresponding descriptions that are consistent with the user's query. The user may select one of these synthetic images and corresponding descriptions (e.g., through a selection of an associated graphical representation for display on a GUI). Based on this selection, the system may generate an improved selection of existing items that are consistent with the user's query and any other user-related information (e.g., information within the user profile). By doing so, representation generation system 102 enables generation of results that are relevant to the user's query by providing the user with an interface for selecting synthetic representations of items that are relevant or of interest to the user. By doing so, representation generation system 102 enables improvements to search results presented to the user, thereby enhancing the accuracy of the presented results, as well as improving user engagement.

Figure 5:
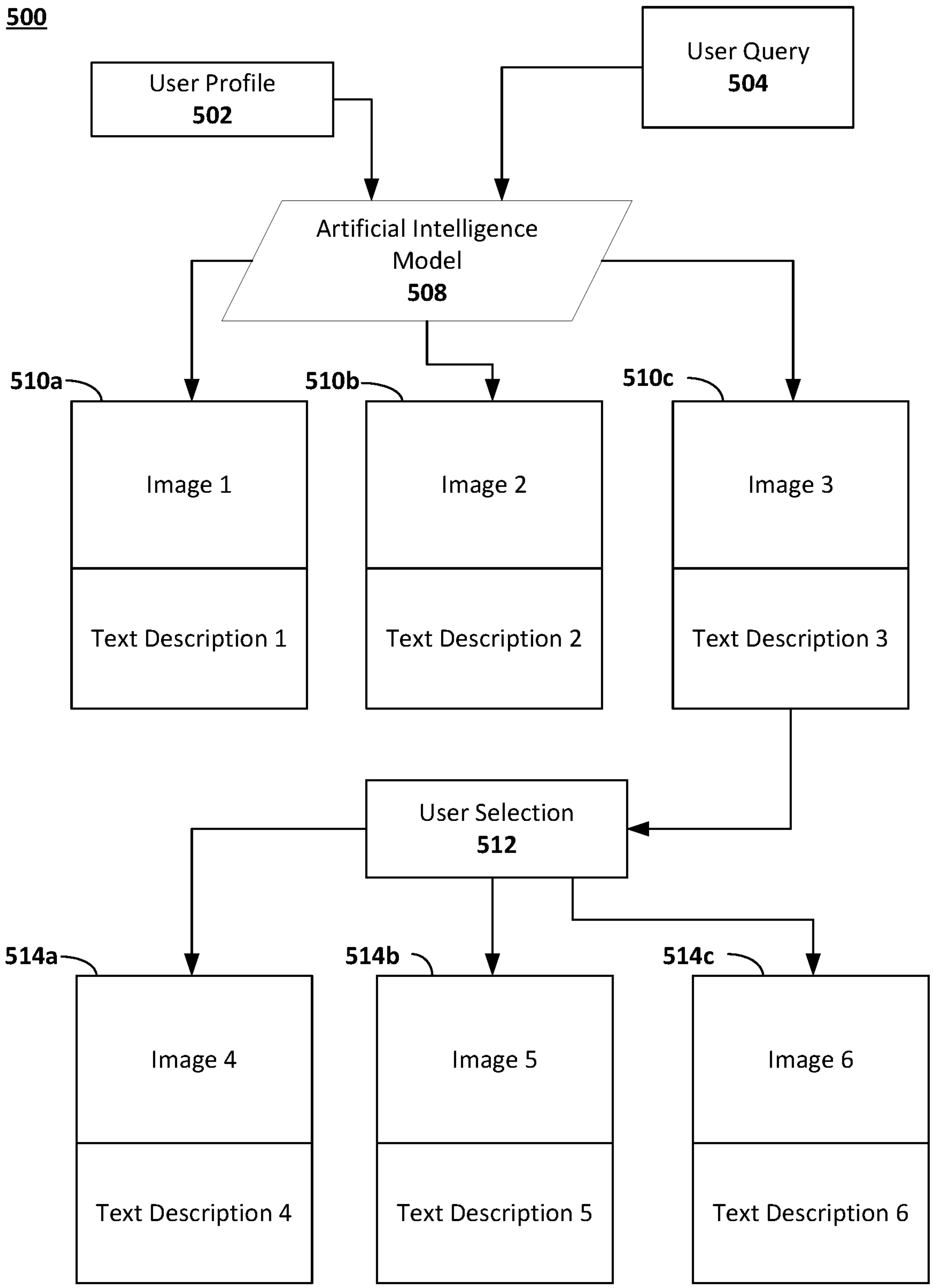
FIG. 5 shows an illustrative schematic for a process for enabling user selection of an item based on personalized, synthetic graphical representations associated with a user query, in accordance with one or more embodiments.

FIG. 5 shows an illustrative schematic for a process for enabling user selection of an item based on personalized, synthetic graphical representations associated with a user query, in accordance with one or more embodiments. For example, flow 500 enables representation generation system 102 to generate synthetic images and corresponding outputs based on a user query and the user's corresponding profile. For example, representation generation system 102 may provide user profile 502 and user query 504 to artificial intelligence model 508 to generate one or more sets of outputs, which may be generated as respective graphical representations 510*a-c*. For example, graphical representation 510*a* may include a natural language output (e.g., a description) and a corresponding synthetic image. Communication subsystem 112 may display these outputs (e.g., as graphical indications or representations on a GUI) for the user. Communication subsystem 112 may receive user selection 512 of one of the generated graphical indications (e.g., graphical representation 510*c*), and may generate representations of matching items (e.g., representative descriptions 514*a-c*) in response to the user's query and the user's selection of a personalized representation of the requested item. As such, the user may select a response for provisioning of an existing item that is consistent with the user query.

In some embodiments, representation generation system 102 may generate outputs (e.g., natural language outputs and corresponding synthetic images) based on the user query and the user profile. For example, response generation subsystem 114 may provide the user data and the first query to a machine learning model to cause the machine learning model to generate a plurality of outputs and a corresponding plurality of images. In some embodiments, each output of the plurality of outputs includes a corresponding description describing a plurality of features associated with the user data and the first query. In some embodiments, one or more characteristics of a corresponding image of the corresponding plurality of images may correspond to the plurality of features. As an illustrative example, response generation subsystem 114 may generate multiple such outputs using the machine learning model, and may provide these outputs to the user for selection. Such outputs (e.g., textual descriptions and corresponding synthetic images) may or may not correspond to existing items. For example, each output may include an indication of a personalized or synthetically generated house that is consistent with the user query and information within the user profile (e.g., a house with an abundance of water features, if the user profile and user query indicate a preference for such houses). In some embodiments, the outputs may include semantic or visual representations of different computing devices that satisfy the user query and/or different lines of credit that satisfy the user query. As each graphical representation may emphasize different features associated with the user query and/or the user profile, representation generation system 102 may provide the user with various different embodiments or interpretations of the user query. By generating such outputs to present to the user, representation generation system 102 enables users to select a personalized or preferred representation of the user query, thereby providing representation generation system 102 with further information relating to the user's preferences with respect to search results.

In some embodiments, representation generation system 102 may generate the plurality of features (e.g., for generation of the graphical representations) based on semantic tokens associated with the generated outputs in response to the user query. For example, representation generation system 102 may generate, for each output of the plurality of outputs, a plurality of semantic tokens corresponding to the user data and the first query. In some embodiments, the plurality of semantic tokens includes words, phrases, or sentences associated with the first query. Representation generation system 102 may generate a first feature of the plurality of features corresponding to each output of the plurality of outputs. In some embodiments, the first feature includes a first semantic token of the plurality of semantic tokens. As an illustrative example, representation generation system 102 may determine features associated with outputs (e.g., natural language outputs with descriptions of representations of the user query) based on semantic tokens generated by the machine learning model. For example, representation generation system 102 may determine words, phrases, or sentences that describe features or elements associated with a given output. By identifying such features, representation generation system 102 may determine features that are emphasized or highlighted in response to the user's query for further tuning of results presented to the user.

In some embodiments, representation generation system 102 may generate the images based on a query image provided by the user. For example, representation generation system 102 (e.g., through response generation subsystem 114) may receive a query image from the user. Representation generation system 102 may provide the query image to the machine learning model to cause the machine learning model to modify the query image to generate the corresponding plurality of images. As an illustrative example, communication subsystem 112 may receive a query image from the user describing an item or search query associated with the user. For example, the user may submit an image with a house that is similar to a requested house (e.g., a lake house) as a search query. In some embodiments, representation generation system 102 may submit an image of a desired computing system. Based on this query, representation generation system 102 may generate similar images, in light of any additional comments, features, or characteristics indicated within the user query and the user profile. As such, representation generation system 102 enables flexibility in the format of the user's query, thereby enabling representation generation system 102 to obtain more descriptive or specific analogues of items that may be consistent with the user's query.

In some embodiments, representation generation system 102 may generate the outputs and synthetic images in light of existing items (e.g., within an item database). For example, representation generation system 102 may obtain, based on the first query, a first description of a first item. Representation generation system 102 may provide the first description to the machine learning model to cause the machine learning model to modify, based on the user data and the first query, the first description to generate a first output of the plurality of outputs. As an illustrative example, representation generation system 102 may generate images based on descriptions or search results associated with the user query, such as based on textual or visual depictions of houses that are being listed, or images/specifications of computing devices that are consistent with the user query. As such, representation generation system 102 enables generation of more accurate, realistic results associated with the user's query, while tailoring or emphasizing features that are relevant to the query or the user.

In some embodiments, representation generation system 102 may generate a plurality of graphical representations for the plurality of outputs and the corresponding plurality of images. In some embodiments, each graphical representation of the plurality of graphical representations includes the corresponding description and the corresponding image. As an illustrative example, representation generation system 102 may generate graphical representations 510*a-c*, where each graphical representation includes a synthetic image corresponding to the user query or any description or representation of the user's query, in light of user profile 502 associated with the user. For example, representation generation system 102 may generate images of houses with water features based on characteristics or features associated with the user query, and/or previous user queries by the user associated with water features. As such, representation generation system 102 enables presentation of user-specific recommendations in response to the user query.

In some embodiments, representation generation system 102 (e.g., through communication subsystem 112) may receive a selection of a graphical representation. For example, representation generation system 102 may receive an indication of a user's click or an interaction with a particular graphical representation (e.g., a click on graphical representation 510*c* within an associated GUI). By receiving feedback from the user regarding a preferred result or output generated by the machine learning model, representation generation system 102 may obtain further information regarding the users preferences and provide the user with access to a corresponding item accordingly.

In some embodiments, representation generation system 102 may train the model using the selection. For example, representation generation system 102 (e.g., through model training subsystem 118) may determine a first image corresponding to the selection of the first graphical representation. Representation generation system 102 may generate a training dataset that includes the first image, the first graphical representation, the user data, and the first query. Representation generation system 102 may provide the training dataset to the machine learning model to train the machine learning model to generate user-specific outputs and user-specific images based on sets of user data and corresponding queries. As an illustrative example, representation generation system 102 may generate an indication of the user selection and store this indication within a dataset, along with the user's original query (e.g., a text string that includes a query for a house with a water feature, or a line of credit) and the user's profile. As such, representation generation system 102 may train the machine learning model to output improved descriptions (e.g., textual descriptions or images) based on user queries, thereby improving the accuracy and efficiency of the model.

In some embodiments, representation generation system 102 may update images based on the user's selection. For example, representation generation system 102 may generate, based on the selection of the first graphical representation, user metadata corresponding to a first description and a first image. Representation generation system 102 may generate, for the user, an updated user profile that includes the user metadata. Representation generation system 102 may provide the updated user profile to the machine learning model to cause the machine learning model to generate updated images and updated outputs. As an illustrative example, representation generation system 102 may update the images in a manner that is informed by the user's selection, thereby improving suggestions provided to the user based on an update to the user profile.

In some embodiments, representation generation system 102 (e.g., through model training subsystem 118) may train the machine learning model based on the updated user profile. For example, representation generation system 102 may provide the updated user profile to the machine learning model to train the machine learning model to generate the updated images and the updated outputs based on input queries. By doing so, representation generation system 102 may generate improved suggestions for users based on the user profiles, thereby generating results that may be more likely to cause user engagement (e.g., user clicks). As such, representation generation system 102 may improve the manner by which personalized, user-specific results may be presented to the user in response to a user query.

In some embodiments, representation generation system 102 may enable a user's access to an item based on the user's selection. For example, based on receiving the selection of the first graphical representation, representation generation system 102 may enable access to a first item corresponding to the first graphical indication. As an illustrative example, representation generation system 102 may provide access to an item that is similar to or that matches a user's selected synthetic image and/or natural language output. For example, representation generation system 102 may provide access to a house with water features similar to those within the generated graphical representations. By doing so, representation generation system 102 may provide a user with access to an item in satisfaction of the user's query.

In some embodiments, representation generation system 102 may generate modified or new descriptions based on existing items and their corresponding descriptions for display to the user. For example, based on receiving the selection of the first graphical representation, representation generation system 102 may obtain, from a description database, a plurality of matching descriptions. Representation generation system 102 may generate a plurality of representative descriptions based on the plurality of matching descriptions. Representation generation system 102 may receive a selection of a first representative description of the plurality of representative descriptions. In some embodiments, access to the first item is enabled further based on receiving the selection of the first representative description. As an illustrative example, representation generation system 102 may generate descriptions (e.g., using techniques, methods and structures described in relation to FIG. 4) based on items within the item description database (e.g., an inventory or product search). For example, representation generation system 102 may extract descriptions associated with items that are similar (e.g., matching descriptions) to the descriptions corresponding to the user-selected graphical representations. Based on these matching descriptions, representation generation system 102 may generate or modify these descriptions further according to the user's query and user profile. As such, representation generation system 102 enables generation of options that are relevant to the user's preferred embodiment of their search query, thereby providing accurate, relevant results to the user, and providing the user with access for the user accordingly.

A matching description may include a description (e.g., of an item, from an item description database) that is associated with or otherwise corresponds to particular data. For example, a matching description may include a description of an item that corresponds to a user-selected graphical representation of an item that was generated in response to the user query and/or the user profile. For example, the matching description may include a description (e.g., within a housing inventory) of a house that is similar to the house queried by the user (e.g., a house with a pool). In situations where the user query is associated with a computing device (e.g., a hardware system) or a line of credit, matching descriptions may correspond to existing computing devices and/or lines of credit that may be available to the user. In some embodiments, representation generation system 102 may generate the matching description through comparing features or characteristics between the user query and item descriptions within an item database, as described in relation to FIG. 4.

A representative description may include a description that is representative of another description. For example, a representative description may include a description (e.g., a matching description, as described above) that is modified to include or emphasize features that are relevant to the user. As an illustrative example, the representative description may include a textual description or a synthetic image where features, characteristics or attributes associated with the user query and/or the user profile are highlighted or emphasized with respect to other features, characteristics, or attributes. As such, the representative description enables representation generation system 102 to provide relevant search results that are tailored to a given user's query and user profile, thereby improving the flexibility and accuracy of the system to generate accurate search results.

In some embodiments, representation generation system 102 may generate representative descriptions based on the machine learning model. For example, representation generation system 102 may provide the plurality of matching descriptions, the first query, and the user profile to the machine learning model to cause the machine learning model to generate the plurality of representative descriptions. As an illustrative example, representation generation system 102 may generate the representative descriptions by providing the matching descriptions, the user's query, and the user profile to a machine learning model (e.g., an LLM and/or an image generation model) in order to generate a representative description (e.g., representative descriptions 514*a*-*c*) that are associated with the user's selection. For example, representation generation system 102 may generate representations of existing, listed houses, with features, characteristics, or attributes that are emphasized in light of the user-requested characteristics (e.g., based on user profile 502 and/or user query 504). By doing so, representation generation system 102 may generate accurate descriptions of existing items that may satisfy the user's query, while emphasizing features that are relevant to the user.

In some embodiments, representation generation system 102 may generate the plurality of matching descriptions based on comparing requested characteristics with characteristics of the items using an item database. For example, representation generation system 102 may determine, based on the selection of the first graphical representation, a plurality of requested characteristics describing a requested item. Representation generation system 102 may obtain a plurality of characteristic sets. In some embodiments, each characteristic set of the plurality of characteristic sets includes a corresponding plurality of item characteristics associated with a corresponding item. Representation generation system 102 may compare each characteristic set of the plurality of characteristic sets with the plurality of requested characteristics. Based on comparing each characteristic set of the plurality of characteristic sets with the plurality of requested characteristics, representation generation system 102 may determine a plurality of items. Representation generation system 102 may retrieve, from an item database, the plurality of matching descriptions corresponding to the plurality of items. As an illustrative example, representation generation system 102 may determine characteristics associated with the user query and/or the subsequently generated graphical representations of the user query (e.g., the requested characteristics); representation generation system 102 may extract items, such as houses, lines of credit, or computing devices, that are consistent with these characteristics. As such, representation generation system 102 may generate items that are associated with the user's query, thereby improving the quality of subsequent results presented to the user.

In some embodiments, representation generation system 102 may determine the plurality of items by calculating corresponding similarity metrics. For example, representation generation system 102 may generate a plurality of similarity metrics. In some embodiments, each similarity metric of the plurality of similarity metrics indicates a similarity between a requested characteristic of the plurality of requested characteristics and a corresponding characteristic set of the plurality of characteristic sets. Representation generation system 102 may determine that a subset of similarity metrics of the plurality of similarity metrics meets a threshold similarity metric. Representation generation system 102 may determine the plurality of items corresponding to the subset of similarity metrics. As an illustrative example, representation generation system 102 may generate matching descriptions through calculation of similarity metrics, as described in relation to FIGS. 3 and 4. By doing so, representation generation system 102 may determine accurate matches that reflect the user's query and user profile.

In some embodiments, representation generation system 102 may update images based on these representative descriptions. For example, representation generation system 102 may provide the plurality of matching descriptions, the first query, and the user profile to the machine learning model to cause the machine learning model to generate a plurality of updated images. In some embodiments, the plurality of updated images corresponds to the plurality of representative descriptions. Representation generation system 102 may generate, for display on a user interface, the plurality of representative descriptions and the plurality of updated images to enable the selection of the first representative description. As an illustrative example, representation generation system 102 may generate modified images of existing items (e.g., of existing houses, computing devices, or lines-of-credit), where such images may include features that are relevant to the user's query or user profile. For example, such updated images may include images of a pool associated with a house, if representation generation system 102 determines that the user profile and/or the user query features pools (or other features) prominently. As such, representation generation system 102 may generate, tune, and update images according to user preference, thereby improving the quality of results presented to the user in response to the user query.

In some embodiments, representation generation system 102 may receive a second query from the user and generate results based on this query. For example, representation generation system 102 may receive a second query from the user. Representation generation system 102 may generate, based on the second query, an updated plurality of outputs and a corresponding plurality of images. Representation generation system 102 may generate an updated plurality of graphical representations. Representation generation system 102 may receive an updated selection of an updated graphical representation of the updated plurality of graphical representations. As an illustrative example, representation generation system 102 may receive another query from the user that modifies or expounds upon the user's request. For example, representation generation system 102 may submit a query that provides further characteristics or features desirable to the user, such as a lake view for a user query directed toward a house, or an additional hard drive for a user query directed toward a computing device. As such, representation generation system 102 enables updating the results generated and presented to the user on the basis of continuous user feedback, thereby improving the quality of such results.

In some embodiments, representation generation system 102 may generate user metadata based on this updated selection. For example, representation generation system 102 may generate, based on the selection of the updated graphical representation, user metadata. In some embodiments, the user metadata includes the second query and, corresponding to the updated selection of the updated graphical representation, a first image and a first description. As an illustrative example, representation generation system 102 may update the user profile to include such user metadata, where the user metadata includes additional information relating to the user's queries and selection. By doing so, representation generation system 102 may improve the quality of subsequent outputs and subsequent graphical representations presented to the user.

Figure 6:
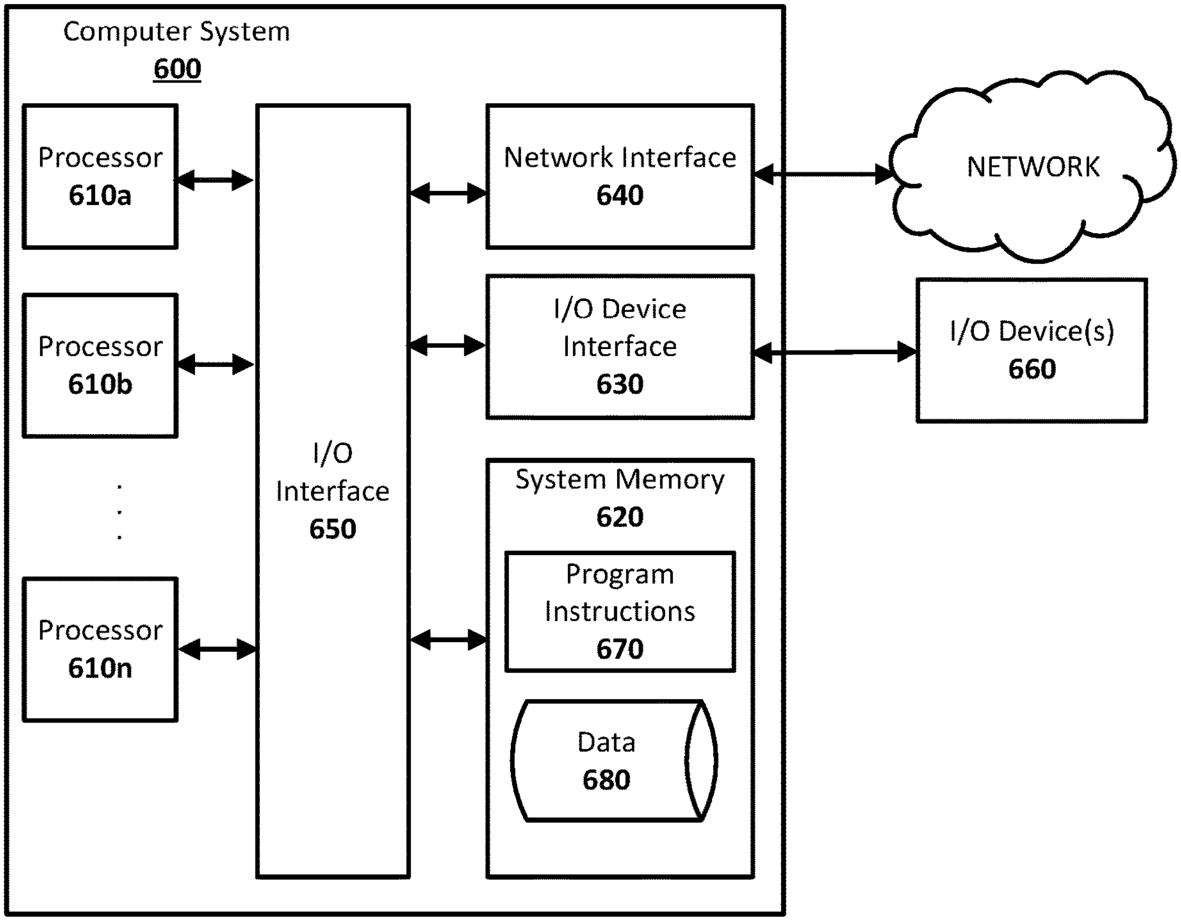
FIG. 6 shows an example computing system that may be used in accordance with one or more embodiments.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations or generate, transmit, or handle all data discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610*a*-610*n*) coupled to system memory 620, an input/output (I/O) device interface 630, and a network interface 640 via an I/O interface 650. A processor may include a single processor, or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610*a*), or a multi-processor system including any number of suitable processors (e.g., processors 610*a*-610*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a GUI presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a LAN, a WAN, a cellular communications network, or the like.

System memory 620 may be configured to store program instructions 670 or data 680. Program instructions 670 may be executable by a processor (e.g., one or more of processors 610*a*-610*n*) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, read-only memory (ROM), programmable ROM (PROM), erasable PROM (EPROM), or electrically EPROM (EEPROM)), volatile memory (e.g., random access memory (RAM), static random-access memory (SRAM), synchronous dynamic RAM (SDRAM)), bulk storage memory (e.g., CD-ROM and/or DVD-ROM, hard drives), or the like.

System memory 620 may include a non-transitory, computer-readable storage medium that may have program instructions stored thereon that are executable by a computer processor (e.g., one or more of processors 610*a*-610*n*) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610*a*-610*n*, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610*a*-610*n*). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a global positioning system (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

Figure 7:
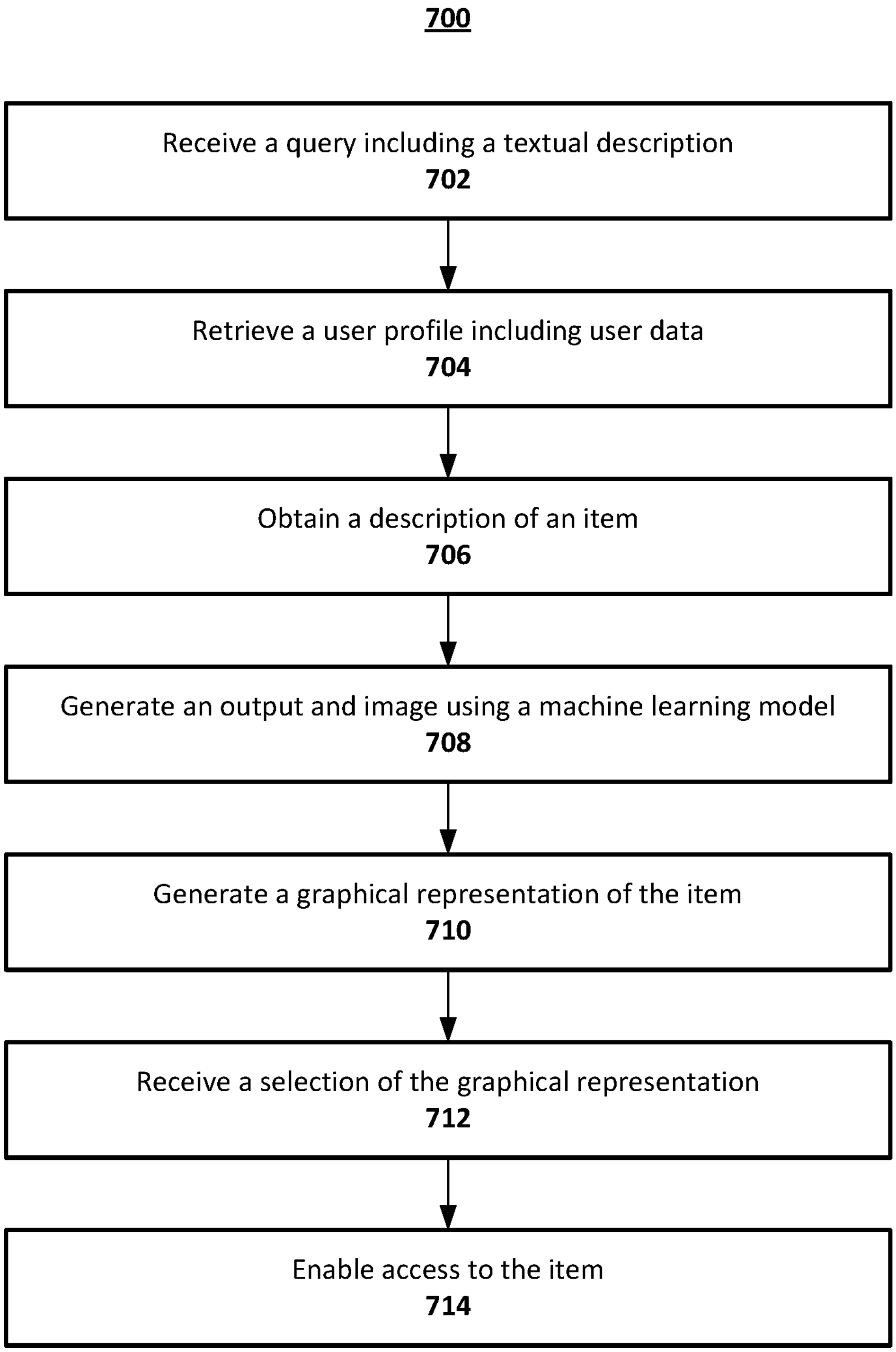
FIG. 7 shows a flowchart of the operations involved in modifying machine learning model-generated text and images based on user queries and profiles, in accordance with one or more embodiments.

FIG. 7 shows a flowchart of the operations involved in modifying machine learning model-generated text and images based on user queries and profiles, in accordance with one or more embodiments. For example, process 700 enables representation generation system 102 to provide users with access to items based on a user's selection of a generated representation of existing items that are available to the user. For example, process 700 enables representation generation system 102 to present houses, computing devices, or lines of credit (e.g., financial products) to the user that are relevant to the user's query and query history (e.g., search history) and emphasize associated features, thereby improving the quality of results presented to the user.

At 702, representation generation system 102 (e.g., using one or more components described above) enables computer system 600 to receive a query from a user. For example, representation generation system 102, through network interface 640 may receive, from a user, a first query that includes a textual description. In some embodiments, representation generation system 102 may receive a query (textual or otherwise, such as an image) for a requested item. As an illustrative example, a user may request information relating to a requested credit card, where the query includes information relating to characteristics of the credit card or associated line of credit. For example, representation generation system 102 may include a description of perks or benefits desired by the user (e.g., travel miles associated with the credit card), as well as a picture of a credit card with similar aesthetics to those desired by the user. Computer system 600 may store the query within system memory through I/O interface 650. By doing so, representation generation system 102 obtains information to assist in evaluating existing items (e.g., existing credit cards or lines of credit) for matches with the user query.

At 704, representation generation system 102 (e.g., using one or more components described above) enables computer system 600 to retrieve a user profile for the user. For example, Computer system 600 may retrieve, using a user identifier associated with the user, a user profile for the user. In some embodiments, the user profile includes user data including a plurality of queries associated with the user identifier. For example, computer system 600 may utilize network interface 640 to query third-party databases 108*a*-108*n* for information relating to the user based on a user identifier (e.g., received with the query). Computer system 600 may receive, through network interface 640, information relating to the user's previous queries, such as a user activity log. For example, the user profile may include previous lines of credit accessed by or applied for by the user. In some embodiments, the user profile may include previous searches of aesthetics or design elements requested by the user within a credit card (e.g., where the user has previously shown interest in metallic credit cards, or credit cards of a gold color). By receiving such information, representation generation system 102 enables retrieval of information that aids in generating personalized results for the user, based on the user's previous searches, thereby improving the quality of suggestions provided to the user.

At 706, representation generation system 102 (e.g., using one or more components described above) enables computer system 600 to obtain a description of an existing item based on the user query and user profile. For example, computer system 600 may obtain, based on the first query, an item description of a first item. As an illustrative example, computer system 600, through network interface 640, may access third-party databases 108*a*-108*n* to determine an existing item in an item database (e.g., an existing credit card) that is consistent with the user's query. For example, computer system 600 may receive information relating to a credit card, where credit card terms or the aesthetic of the credit card is compatible with the user's query. Computer system 600 may store such information as data 680 within system memory 620, for example. By doing so, representation generation system 102 may generate results that are consistent with the user's request, thereby enabling representation generation system 102 to generate personalized, user-tailored results based on the user's query.

At 708, representation generation system 102 (e.g., using one or more components described above) enables computer system 600 to generate an output and a synthetic image based on the user profile, the query, and the user profile. For example, computer system 600 may provide the user profile, the first query, and the first description to a machine learning model to cause the machine learning model to generate a first output and a first image. In some embodiments, the first output includes an indication of a plurality of features corresponding to the first description and the user profile. In some embodiments, characteristics of the first image correspond to the plurality of features. As an illustrative example, computer system 600 may utilize program instructions 670 stored within system memory 620, as well as any of processors 610*a*-610*n*, to generate an output (e.g., a text description) and an image (e.g., a synthetic image) associated with the item from the item database, as well as based on the user query and the user profile. Computer system 600 may store these outputs within system memory 620 (e.g., as data 680). For example, computer system 600 may generate images of existing credit cards, as well as corresponding descriptions of their properties (e.g., credit card terms) in a manner that emphasizes the features sought by the user, as specified in the user query or in previous queries submitted by the user. As such, representation generation system 102 enables generation of relevant results in a manner that is engaging to the user.

At 710, representation generation system 102 (e.g., using one or more components described above) enables computer system 600 to generate a graphical representation of the item based on the synthetic image and the output. For example, computer system 600 may generate a first graphical representation of the first item. In some embodiments, the first graphical representation of the first item includes the first image and a representation of the first output. As an illustrative example, computer system 600 may cause generation of a tile or another graphical representation of the machine learning model output on a user interface, such as on a user interface associated with the network that is connected to network interface 640. For example, computer system 600 may generate, using program instructions 670, an indication of a credit card that matches the user's query, with a description and an image that are tailored to the user's requested characteristics (e.g., aesthetic characteristics). By doing so, computer system 600 enables representation generation system 102 to present relevant search results to users in a personalized, engaging manner.

At 712, representation generation system 102 (e.g., using one or more components described above) enables computer system 600 to receive a selection of the graphical representation corresponding to the item. For example, computer system 600 may receive a selection of the first graphical representation of the first item. As an illustrative example, computer system 600 may receive, through network interface 640, a selection of the graphical representation that corresponds to the item. For example, representation generation system 102 may receive an indication that the user clicked on a tile associated with the corresponding credit card. By receiving this selection, representation generation system 102 may train the machine learning model further to improve the accuracy of the model when providing personalized results. In some embodiments, representation generation system 102 may provide the user with access to the requested item.

At 714, representation generation system 102 (e.g., using one or more components described above) enables computer system 600 to enable user access to the item based on the selection. For example, based on receiving the selection of the first graphical representation of the first item, computer system 600 may enable access to the first item. As an illustrative example, computer system 600 may generate a signal or a command (e.g., utilizing program instructions 670 within system memory 620) to enable a user's access to a credit card application corresponding to the credit card, or to a line of credit associated with the credit card. By doing so, representation generation system 102 enables users to receive access to a preferred item, based on results of the personalized search.

Figure 8:
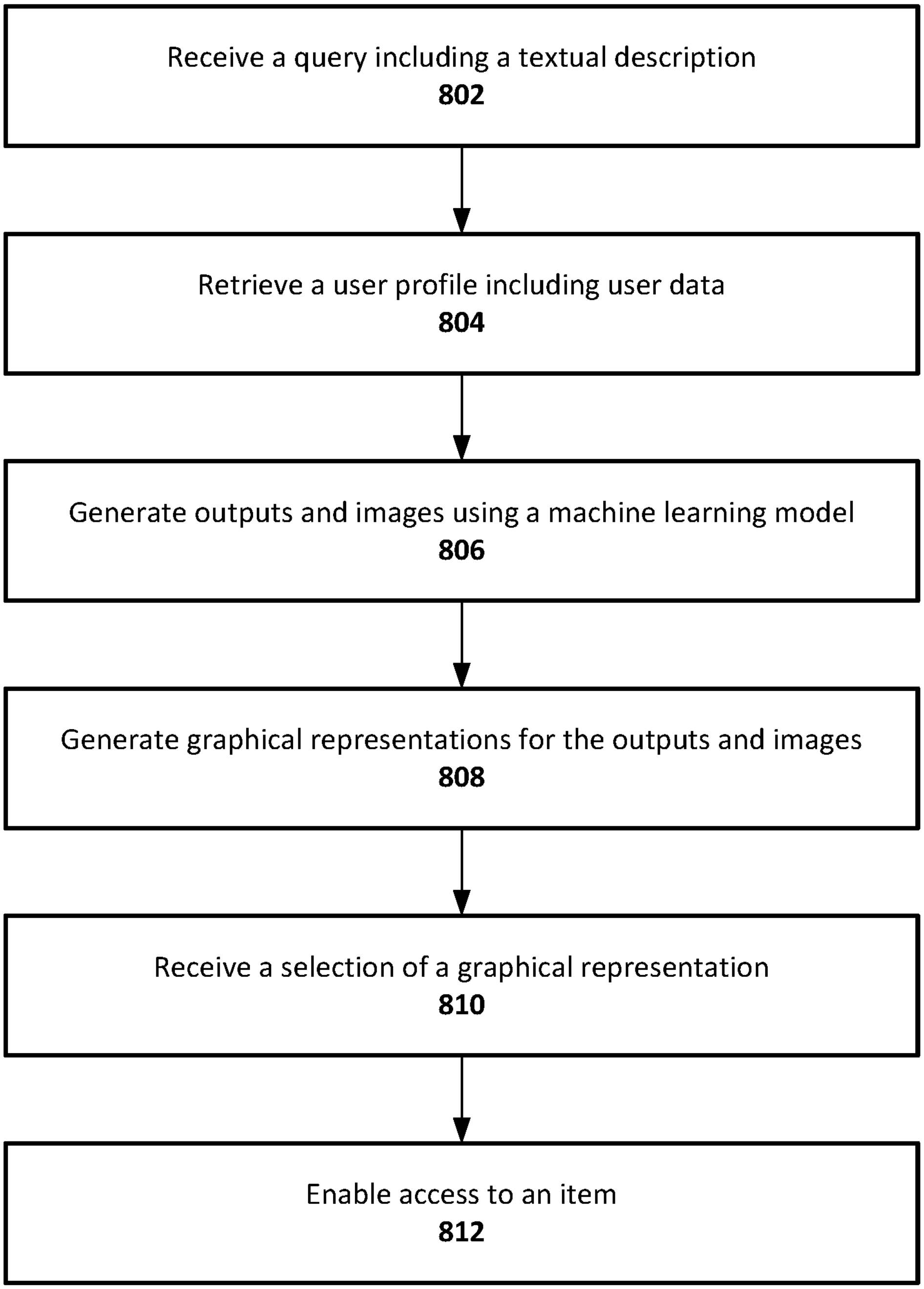
FIG. 8 shows a flowchart of the operations involved in providing a user interface for selection of machine learning model-based results tuned on user queries and profiles, in accordance with one or more embodiments.

FIG. 8 shows a flowchart of the operations involved in providing a user interface for selection of machine learning model-based results tuned on user queries and profiles, in accordance with one or more embodiments. For example, process 800 enables representation generation system 102 to provide users with access to items based on a user's selection of a generated representation of a personalized representation of the user's query, where the generated representation emphasizes or highlights features that are relevant to the user's query and/or previous search queries. For example, process 800 enables representation generation system 102 to present representations of credit cards (real or fictional) that correspond to the characteristics associated with the user's request. Based on the user's selection of one or more of these representations, process 800 may provide access to a relevant item, thereby satisfying the user's query based on information relating to the user.

At 802, representation generation system 102 (e.g., using one or more components described above) enables computer system 600 to receive a query from a user. For example, computer system 600 (e.g., at network interface 640) may receive, from a user, a first query that includes a textual description. Computer system 600 may store the first query within system memory 620 as data 680. As an illustrative example, representation generation system 102 may receive a query for a requested credit card, with a particular aesthetic (e.g., a color or a material) and a requested set of terms (e.g., interest rate or annual fee). By receiving such a query, representation generation system 102 enables generation of user-specific results that are consistent with the user's requested item.

At 804, representation generation system 102 (e.g., using one or more components described above) enables computer system 600 to retrieve a user profile that includes user data.

For example, computer system 600 may retrieve, using a user identifier associated with the user, a user profile for the user. In some embodiments, the user profile includes user data that includes a plurality of queries associated with the user identifier. For example, computer system 600 may store the user profile within system memory 620. As an illustrative example, representation generation system 102 may receive information relating to the user, such as previous queries for lines of credit or credit cards. For example, the user profile may include a credit history associated with the user. As such, representation generation system 102 may obtain information that is relevant to the user and the user's query; based on this information, representation generation system 102 may improve the accuracy and relevance of results presented to the user in response to the query.

At 806, representation generation system 102 (e.g., using one or more components described above) enables computer system 600 to generate an output and an image based on the user profile and the query. For example, computer system 600 may provide the user data (e.g., the user profile) and the first query to a machine learning model (e.g., using program instructions 670 and any of processors 610$a$-610$n$) to cause the machine learning model to generate a plurality of outputs and a corresponding plurality of images. In some embodiments, each output of the plurality of outputs includes a corresponding description describing a plurality of features associated with the user data and the first query. In some embodiments, one or more characteristics of a corresponding image of the corresponding plurality of images correspond to the plurality of features. As an illustrative example, computer system 600 may generate the outputs (e.g., textual and/or image data) based on an LLM and/or an image generation model. The output may include descriptions (e.g., textual or image-based) for different personalized (e.g., non-existing) or existing items, including credit cards. For example, an image may correspond to an aesthetic or color for a credit card similar to one requested by the user, generated through an artificial intelligence image generation model. The corresponding textual description may include a description of the credit card that highlights features that are associated with the user profile and/or the user query (e.g., that are consistent with terms requested by the user and/or an associated credit report or credit score). By generating such images and corresponding textual descriptions, representation generation system 102 enables generation of content that matches the user's query and the user's preferences (e.g., as expressed in the user profile), thereby enabling personalized generation of results to the user in response to the query.

At 808, representation generation system 102 (e.g., using one or more components described above) enables computer system 600 to generate graphical representations for the outputs and images for user display. For example, computer system 600 may generate, through network interface 640, a plurality of graphical representations for the plurality of outputs and the corresponding plurality of images. In some embodiments, each graphical representation of the plurality of graphical representations includes the corresponding description and the corresponding image. As an illustrative example, computer system 600 may generate graphical representations, such as tiles on a GUI, corresponding to different images and textual descriptions generated by the machine learning model. For example, each tile may include a representation of a personalized credit card that is consistent with the user profile and the user query, including a description of the credit card and an image. By generating such representations, representation generation system 102 may obtain further information relating to user preferences, as well as characteristics (aesthetic or otherwise) desired by the user, based on the corresponding characteristics of the graphical representations.

At 810, representation generation system 102 (e.g., using one or more components described above) enables computer system 600 to receive a selection of the graphical representation. For example, computer system 600 may receive, through network interface 640, a selection of a first graphical representation of the plurality of graphical representations. As an illustrative example, computer system 600 may receive an indication of a click or another interaction with a control on the GUI associated with a given graphical representation. For example, the graphical representation may correspond to a particular representation of a requested credit card that is consistent with the user query. By receiving the indication, representation generation system 102 receives information relating to the user's preferred version or type of item (e.g., credit card), thereby enabling the representation generation system 102 to further improve the accuracy of the model in generating suggestions, or to determine an existing credit card that fits this selection for provision to the user.

At 812, representation generation system 102 (e.g., using one or more components described above) enables computer system 600 to enable user access to an item based on the user's selection of the graphical representation. For example, based on receiving the selection of the first graphical representation, computer system 600 may, through network interface 640, enable access to a first item corresponding to the first graphical representation. As an illustrative example, computer system 600 may receive a selection of an item corresponding to or similar to the chosen graphical representation (e.g., an item from an existing item database), such as an existing credit card that has features similar to those represented within the graphical representation. As such, computer system 600 may provide access to this item (e.g., a credit card application for the credit card, or access to the line of credit and the credit card itself) based on the user's selection of the graphical representation. By doing so, representation generation system 102 enables provision of resources and items to users that are consistent with their queries in a personalized and engaging manner, where features associated with the user (e.g., particular credit card aesthetic styles or credit card terms) are emphasized or highlighted for display to the user.

It is contemplated that the steps or descriptions of FIGS. 7 and 8 may be used with any other embodiment of this disclosure. In addition, the steps and descriptions described in relation to FIGS. 7 and 8 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIGS. 7 and 8.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This patent application is one of a set of patent applications filed on the same day by the same applicant. These patent applications have the following titles: SYSTEMS AND METHODS FOR MODIFICATION OF MACHINE LEARNING MODEL-GENERATED TEXT AND IMAGES BASED ON USER QUERIES AND PROFILES and (2) SYSTEMS AND METHODS FOR USER SELECTION OF MACHINE LEARNING MODEL-BASED RESULTS BASED ON USER QUERIES AND PROFILES. The entire contents of each of the foregoing other patent applications are hereby incorporated by reference.

The present techniques will be better understood with reference to the following enumerated embodiments:

1. A method comprising receiving, via a user interface of a user device, an item query, wherein the item query includes a description of a requested item, retrieving, using a user identifier for a user associated with the user device, a user profile for the user, wherein the user profile comprises user data associated with the user identifier, the user data including a plurality of previous user queries, obtaining, based on the item query, a first item description of a first item, providing the user profile, the item query, and the first item description to an artificial intelligence model to cause the artificial intelligence model to generate a natural language output and a synthetic image, wherein the natural language output comprises a textual description comprising a plurality of features corresponding to the item query, the first item description, and the user profile, and wherein characteristics of the synthetic image correspond to the plurality of features, generating, for display on the user interface, a graphical indication of the first item, wherein the graphical indication of the first item comprises the synthetic image and the natural language output, based on receiving, via the user interface, a selection of the graphical indication of the first item, enabling access to the first item via the user interface, and providing the user data and the selection of the graphical indication of the first item to the artificial intelligence model to train the artificial intelligence model to output natural language outputs and synthetic images based on user profiles and corresponding item queries.
2. A method comprising receiving, from a user, a first query comprising a textual description, retrieving, using a user identifier associated with the user, a user profile for the user, wherein the user profile comprises user data including a plurality of queries associated with the user identifier, obtaining, based on the first query, a first description of a first item, providing the user profile, the first query, and the first description to a machine learning model to cause the machine learning model to generate a first output and a first image, wherein the first output comprises an indication of a plurality of features corresponding to the first description and the user profile, and wherein characteristics of the first image correspond to the plurality of features, and generating a first graphical representation of the first item, wherein the first graphical representation of the first item comprises the first image and a representation of the first output, receiving a selection of the first graphical representation of the first item, and, based on receiving the selection of the first graphical representation of the first item, enabling access to the first item.
3. A method comprising receiving, via a user interface of a user device, a query, wherein the query includes a description of a requested item, retrieving, using a user identifier for a user associated with the user device, a user profile for the user, wherein the user profile comprises user data associated with the user identifier, the user data including a plurality of previous user queries, obtaining, based on the query, a first description, obtaining, via a machine learning model, an output and a synthetic image based on the user profile, the query, and the first description, wherein the output comprises a textual description comprising a plurality of features corresponding to the query, the first description and the user profile, and wherein characteristics of the synthetic image correspond to the plurality of features, and generating, for display on the user interface, a graphical indication, wherein the graphical indication comprises the synthetic image and the output.
4. The method of any one of the preceding embodiments, wherein obtaining the first description of the first item comprises determining, based on the first query, a plurality of requested characteristics describing a requested item, obtaining a plurality of characteristic sets, wherein each characteristic set of the plurality of characteristic sets comprises a corresponding plurality of item characteristics associated with a corresponding item, comparing each characteristic set of the plurality of characteristic sets with the plurality of requested characteristics, based on comparing each characteristic set of the plurality of characteristic sets with the plurality of requested characteristics, determining the first item, and retrieving, from an item database, the first description of the first item.
5. The method of any one of the preceding embodiments, wherein, based on comparing each characteristic set of the plurality of characteristic sets with the plurality of requested characteristics, determining the first item comprises generating a plurality of similarity metrics, wherein each similarity metric of the plurality of similarity metrics indicates a similarity between a requested characteristic of the plurality of requested characteristics and a corresponding characteristic set, for a corresponding item, of the plurality of characteristic sets, determining that a first similarity metric of the plurality of similarity metrics meets a threshold similarity metric, and determining the first item, wherein the first item corresponds to the first similarity metric.
6. The method of any one of the preceding embodiments, wherein generating the first graphical representation of the first item comprises determining a subset of similarity metrics of the plurality of similarity metrics, wherein each similarity metric of the subset of similarity metrics meets the threshold similarity metric, and generating a ranked list of graphical representations of items, the ranked list of graphical representations comprising the first graphical representation of the first item, wherein the graphical representations are ranked according to the plurality of similarity metrics.
7. The method of any one of the preceding embodiments, further comprising obtaining a first characteristic set corresponding to the first item, wherein the first characteristic set includes characteristics describing the first item, determining whether the characteristics of the first image correspond to the first characteristic set, and based on determining that a first characteristic of the first image does not correspond to the first characteristic set, providing the user data, the first query, and the first description to the machine learning model to generate a second image distinct from the first image.

8. The method of any one of the preceding embodiments, wherein generating the first output comprises generating, via the machine learning model, a plurality of semantic tokens corresponding to the first description and the user data, wherein the plurality of semantic tokens includes words, phrases, or sentences associated with the first description, and generating a first feature of the plurality of features to comprise a first semantic token of the plurality of semantic tokens.

9. The method of any one of the preceding embodiments, further comprising generating, based on the selection of the first graphical representation of the first item, user metadata comprising the first image and the representation of the first output, generating, for the user, an updated user profile comprising the user metadata, and providing the updated user profile to the machine learning model to cause the machine learning model to generate updated images and updated outputs.

10. The method of any one of the preceding embodiments, further comprising generating, based on the selection of the first graphical representation of the first item, training data comprising the first image, the representation of the first output, and the user profile, and providing the training data to the machine learning model to train the machine learning model to generate images and outputs based on input user profiles.

11. The method of any one of the preceding embodiments, further comprising receiving a second query from a user, obtaining, based on the second query, a second description of a second item, and providing the user profile, the second query, and the second description to the machine learning model to cause the machine learning model to generate a second output and a second image.

12. The method of any one of the preceding embodiments, further comprising generating, for display on a user interface, the first graphical representation of the first item and a second graphical representation of the second item, receiving a selection of the second graphical representation of the second item, and based on receiving the selection of the second graphical representation of the second item, enabling access to the second item.

13. The method of any one of the preceding embodiments, wherein retrieving the user profile for the user comprises obtaining, from a user activity database, a user activity log corresponding to the user, obtaining a plurality of user queries, and obtaining user metadata corresponding to the user, wherein the user metadata comprises demographic information associated with the user.

14. The method of any one of the preceding embodiments, further comprising providing the user profile, the first query, and the first description to the machine learning model to cause the machine learning model to generate a second output and a second image, wherein the second output is distinct from the first output, and wherein the second image is distinct from the first image, generating a second graphical representation of the first item, wherein the second graphical representation of the first item comprises the second image and a representation of the second output, receiving a selection of the second graphical representation of the first item, and based on receiving the selection of the second graphical representation of the first item, enabling access to the first item.

15. The method of any one of the preceding embodiments, further comprising obtaining, based on the first query, a second description of a second item, providing the user profile, the first query, and the second description to the machine learning model to cause the machine learning model to generate a second output and a second image, generating a second graphical representation of the second item, wherein the second graphical representation of the second item comprises the second image and a representation of the second output, receiving a selection of the second graphical representation of the second item, and, based on receiving the selection of the second graphical representation of the second item, enabling access to the second item.

16. The method of any one of the preceding embodiments, further comprising generating, based on the selection of the second graphical representation of the second item, training data comprising the second image, the representation of the second output, and the user profile, and providing the training data to the machine learning model to train the machine learning model to generate images and outputs based on input user profiles.

17. A method comprising receiving, via a user interface of a user device, an item query, wherein the item query includes a description of a requested item, retrieving, using a user identifier for a user associated with the user device, a user profile for the user, wherein the user profile comprises user data associated with the user identifier, the user data including a plurality of previous user queries, providing the user data and the item query to an artificial intelligence model to cause the artificial intelligence model to generate a plurality of natural language outputs and a corresponding plurality of synthetic images, wherein each natural language output of the plurality of natural language outputs comprises a corresponding textual description describing a plurality of features associated with the user data and the item query, and wherein one or more characteristics of a corresponding synthetic image of the corresponding plurality of synthetic images correspond to the plurality of features, generating, for display on the user interface, a plurality of graphical indications for the plurality of natural language outputs and the corresponding plurality of synthetic images, wherein each graphical indication of the plurality of graphical indications comprises a corresponding textual description and a corresponding synthetic image, based on receiving, via the user interface, a selection of a first graphical indication, obtaining, from an item description database, a plurality of matching item descriptions, generating, for display on the user interface, a plurality of modified descriptions corresponding to the plurality of matching item descriptions, wherein each modified description of the plurality of modified descriptions comprises one or more features of the plurality of features associated with the user data and the item query, and, based on receiving a selection of a first modified description of the plurality of modified descriptions, enabling, via the user interface, access to a first item corresponding to the first modified description.

18. A method comprising receiving, from a user, a first query comprising a textual description, retrieving, using a user identifier associated with the user, a user profile for the user, wherein the user profile comprises user data including a plurality of queries associated with the user identifier, providing the user data and the first query to a machine learning model to cause the machine learning model to generate a plurality of outputs and a corresponding plurality of images, wherein each output of the plurality of outputs comprises a corresponding description describing a plurality of features associated with the user data and the first query, and wherein one or more characteristics of a corresponding image of the corresponding plurality of images correspond to the plurality of features, generating a plurality of graphical representations for the plurality of outputs and the corresponding plurality of images, wherein each graphical representation of the plurality of graphical representations comprises the corresponding description and the corresponding image, receiving a selection of a first graphical representation of the plurality of graphical representations, and, based on receiving the selection of the first graphical representation, enabling access to a first item corresponding to the first graphical representation.

19. A method comprising receiving, from a user, a first query comprising a textual description; retrieving a user profile for the user, wherein the user profile comprises user data, obtaining, via a machine learning model, a plurality of outputs and a corresponding plurality of images based on the user profile and the first query, wherein each output of the plurality of outputs comprises a corresponding description describing a plurality of features associated with the user data and the first query, and wherein one or more characteristics of a corresponding image of the corresponding plurality of images correspond to the plurality of features, generating, for display on a user interface, a plurality of graphical representations for the plurality of outputs and the corresponding plurality of images, wherein each graphical representations of the plurality of graphical representations comprises the corresponding description and the corresponding image, receiving a selection of a first graphical representation of the plurality of graphical representations, and, based on receiving the selection of the first graphical representation, enabling access to a first item corresponding to the first graphical representation.

20. The method of any one of the preceding embodiments, further comprising determining a first image corresponding to the selection of the first graphical representation, generating a training dataset comprising the first image, the first graphical representation, the user data, and the first query, and providing the training dataset to the machine learning model to train the machine learning model to generate user-specific outputs and user-specific images based on sets of user data and corresponding queries.

21. The method of any one of the preceding embodiments, wherein, based on receiving the selection of the first graphical representation, enabling access to the first item further comprises, based on receiving the selection of the first graphical representation, obtaining, from a description database, a plurality of matching descriptions, generating a plurality of representative descriptions based on the plurality of matching descriptions, and receiving a selection of a first representative description of the plurality of representative descriptions, wherein access to the first item is enabled further based on receiving the selection of the first representative description.

22. The method of any one of the preceding embodiments, wherein generating the plurality of representative descriptions comprises providing the plurality of matching descriptions, the first query, and the user profile to the machine learning model to cause the machine learning model to generate the plurality of representative descriptions.

23. The method of any one of the preceding embodiments, wherein enabling access to the first item comprises providing the plurality of matching descriptions, the first query, and the user profile to the machine learning model to cause the machine learning model to generate a plurality of updated images, wherein the plurality of updated images corresponds to the plurality of representative descriptions, and generating, for display on a user interface, the plurality of representative descriptions and the plurality of updated images to enable the selection of the first representative description.

24. The method of any one of the preceding embodiments, wherein obtaining the plurality of matching descriptions comprises determining, based on the selection of the first graphical representation, a plurality of requested characteristics describing a requested item, obtaining a plurality of characteristic sets, wherein each characteristic set of the plurality of characteristic sets comprises a corresponding plurality of item characteristics associated with a corresponding item, comparing each characteristic set of the plurality of characteristic sets with the plurality of requested characteristics, based on comparing each characteristic set of the plurality of characteristic sets with the plurality of requested characteristics, determining a plurality of items, and retrieving, from an item database, the plurality of matching descriptions corresponding to the plurality of items.

25. The method of any one of the preceding embodiments, wherein, based on comparing each characteristic set of the plurality of characteristic sets with the plurality of requested characteristics, determining the plurality of items comprises generating a plurality of similarity metrics, wherein each similarity metric of the plurality of similarity metrics indicates a similarity between a requested characteristic of the plurality of requested characteristics and a corresponding characteristic set of the plurality of characteristic sets, determining that a subset of similarity metrics of the plurality of similarity metrics meets a threshold similarity metric, and determining the plurality of items corresponding to the subset of similarity metrics.

26. The method of any one of the preceding embodiments, wherein providing the user data and the first query to the machine learning model to cause the machine learning model to generate the plurality of outputs comprises generating, for each output of the plurality of outputs, a plurality of semantic tokens corresponding to the user data and the first query, wherein the plurality of semantic tokens includes words, phrases, or sentences associated with the first query, and generating a first feature of the plurality of features corresponding to each output of the plurality of outputs, wherein the first feature comprises a first semantic token of the plurality of semantic tokens.

27. The method of any one of the preceding embodiments, further comprising generating, based on the selection of the first graphical representation, user metadata corresponding to a first description and a first image, generating, for the user, an updated user profile comprising the user metadata, and providing the updated user profile to the machine learning model to cause the machine learning model to generate updated images and updated outputs.

28. The method of any one of the preceding embodiments, further comprising providing the updated user profile to the machine learning model to train the machine learning model to generate the updated images and the updated outputs based on input queries.

29. The method of any one of the preceding embodiments, further comprising, receiving a second query from the user, generating, based on the second query, an updated plurality of outputs and a corresponding plurality of images, generating an updated plurality of graphical representations, and receiving an updated selection of an updated graphical representation of the updated plurality of graphical representations.

30. The method of any one of the preceding embodiments, further comprising, generating, based on the selection of the updated graphical representation, user metadata, wherein the user metadata comprises the second query and, corresponding to the updated selection of the updated graphical representation, a first image and a first description.

31. The method of any one of the preceding embodiments, wherein retrieving the user profile for the user comprises obtaining, from a user activity database, a user activity log corresponding to the user, obtaining a plurality of user queries, and obtaining user metadata corresponding to the user, wherein the user metadata comprises demographic information associated with the user.

32. The method of any one of the preceding embodiments, wherein causing the machine learning model to generate the corresponding plurality of images comprises receiving a query image from the user, and providing the query image to the machine learning model to cause the machine learning model to modify the query image to generate the corresponding plurality of images.

33. The method of any one of the preceding embodiments, wherein causing the machine learning model to generate the plurality of outputs comprises obtaining, based on the first query, a first description of a first item, and providing the first description to the machine learning model to cause the machine learning model to modify, based on the user data and the first query, the first description to generate a first output of the plurality of outputs.

34. One or more tangible, non-transitory, computer-readable media storing instructions that, when executed by a data processing apparatus, cause the data processing apparatus to perform operations comprising those of any of embodiments 1-33.

35. A system comprising one or more processors, and memory storing instructions that, when executed by the processors, cause the processors to effectuate operations comprising those of any of embodiments 1-33.

36. A system comprising means for performing any of embodiments 1-33.

What is claimed is:

1. A system for reducing image-based hallucination generation in machine-learning models for generating user-specific images on features identified within user queries, the system comprising:

one or more processors; and one or more non-transitory, computer-readable media storing instructions that, when executed by the one or more processors, cause operations comprising:

obtaining, based on a query, an item description of a first item;

providing previous queries of a user profile, the query, and the first item description to a one or more machine learning n artificial intelligence-models to cause the one or more machine learning models to generate a first synthetic image and a text output that comprises a plurality of features corresponding to the item description and the user profile, wherein characteristics of the first synthetic image correspond to the plurality of features;

determining that one or more characteristics of the first synthetic image do not contain features that are relevant to the query or the first item by detecting the one or more characteristics of the first synthetic image do not satisfy a set of matching criteria associated with the first item;

generating a second synthetic image based on the one or more characteristics of the first synthetic image not satisfying the set of matching criteria;

generating a graphical representation of the first item comprising the second synthetic image and a representation of the text output;

in response to receiving a selection of the graphical representation of the first item, updating the one or more machine learning models to reduce hallucination generation likelihood by retraining the one or more machine learning models based on the text output and the second synthetic image in lieu of the first synthetic image; and updating the user profile by generating user metadata based on additional outputs of the retrained machine learning model associated with a later query.

2. A method for reducing image-based hallucination generation in machine-learning models, the method comprising:

obtaining by one or more processors, based on a query, an item description of a first item;

providing, by the one or more processors, previous queries of a user profile, the query, and the item description to one or more machine learning models to cause the one or more machine learning models to generate a first synthetic image and a text output that comprises an indication of a plurality of features corresponding to the item description and the user profile, wherein characteristics of the first synthetic image correspond to the plurality of features;

determining, by the one or more processors, that one or more characteristics of the first synthetic image do not satisfy a set of matching criteria associated with the first item;

generating, by the one or more processors, a second synthetic image based on the one or more characteristics of the first synthetic image not satisfying the set of matching criteria;

generating, by the one or more processors, a graphical representation of the first item comprising the second synthetic image and a representation of the text output;

receiving, by the one or more processors, a selection of the graphical representation of the first item;

in response to receiving the selection of the graphical representation of the first item, updating, by the one or more processors, the one or more machine learning models to reduce hallucination generation likelihood by retraining the one or more machine learning models based on the text output and the second synthetic image; and updating, by the one or more processors, the user profile by generating user metadata based on additional outputs of the one or more machine learning models associated with a later query.

3. The method of claim 2, wherein obtaining the first-item description of the first item comprises:

determining, based on the query, a plurality of requested characteristics describing a requested item;

obtaining a plurality of characteristic sets, wherein each characteristic set of the plurality of characteristic sets comprises a corresponding plurality of item characteristics associated with a corresponding item;

comparing each characteristic set of the plurality of characteristic sets with the plurality of requested characteristics;

in response to comparing each characteristic set of the plurality of characteristic sets with the plurality of requested characteristics, determining the first item; and retrieving, from an item database, the item description of the first item.

4. The method of claim 3, wherein, in response to comparing each characteristic set of the plurality of characteristic sets with the plurality of requested characteristics, determining the first item comprises:

generating a plurality of similarity metrics, wherein each similarity metric of the plurality of similarity metrics indicates a similarity between a requested characteristic of the plurality of requested characteristics and a corresponding characteristic set, for a corresponding item, of the plurality of characteristic sets;

determining that a first similarity metric of the plurality of similarity metrics meets a threshold similarity metric; and determining the first item, wherein the first item corresponds to the first similarity metric.

5. The method of claim 4, wherein generating the graphical representation of the first item comprising the second synthetic image and a representation of the text output further comprises:

determining a subset of similarity metrics of the plurality of similarity metrics, wherein each similarity metric of the subset of similarity metrics meets the threshold similarity metric; and generating a ranked list of a plurality of graphical representations of items comprising the graphical representation of the first item, wherein the plurality of graphical representations are ranked according to the plurality of similarity metrics.

6. The method of claim 2, wherein generating the second synthetic image based on the one or more characteristics of the first synthetic image not satisfying the set of matching criteria in response to providing the query and the item description of the first item to the one or more machine learning models, wherein the second synthetic image distinct from the first synthetic image.

7. The method of claim 2, wherein generating the text output comprises:

generating, via the one or more machine learning models, a plurality of semantic tokens corresponding to the item description and the query, wherein the plurality of semantic tokens includes words, phrases, or sentences associated with the item description; and generating a first feature of the plurality of features to comprise a first semantic token of the plurality of semantic tokens.

8. The method of claim 2, further comprising:

generating, based on the selection of the graphical representation of the first item, training data comprising the first synthetic image, the representation of the text output, and the user profile; and providing the training data to the one or more machine learning models to train the one or more machine learning models to generate images and text outputs based on input user profiles.

9. The method of claim 8, further comprising:

receiving a second query from a user;

obtaining, based on the second query, a second item description of a second item; and providing the user profile, the second query, and the second item description to the one or more machine learning models to cause the one or more machine learning models to generate a second output and a second image.

10. The method of claim 9, further comprising:

generating, for display on a user interface, the graphical representation of the first item and a second graphical representation of the second item;

receiving a selection of the second graphical representation of the second item; and based on receiving the selection of the second graphical representation of the second item, enabling access to the second item.

11. The method of claim 2, further comprising:

generating a second text output based on the one or more characteristics of the first synthetic image not satisfying the set of matching criteria, wherein the second text output is distinct from the text output;

generating a second graphical representation of the first item, wherein the second graphical representation of the first item comprises the second synthetic image and a representation of the second text output;

receiving a selection of the second graphical representation of the first item; and in response to receiving the selection of the second graphical representation of the first item, enabling access to the first item.

12. The method of claim 2, further comprising:

obtaining, based on the query, a second item description of a second item;

providing previous queries of a user profile, the query, and the second item description to the one or more machine learning models to cause the one or more machine learning models to generate third synthetic image and a second text output;

determining that the one or more characteristics of the third synthetic image do not satisfy a set of matching criteria associated with the second item; and generating a fourth synthetic image based on the one or more characteristics of the third synthetic image not satisfying the set of matching criteria.

13. The method of claim 12, further comprising:

generating a second graphical representation of the second item, wherein the second graphical representation of the second item comprises the third synthetic image and a representation of the second text output;

receiving a selection of the second graphical representation of the second item; and in response to receiving the selection of the second graphical representation of the second item, updating the one or more machine learning models to reduce hallucination generation likelihood by retraining the one or more machine learning models based on the second text output and the third synthetic image in lieu of the third synthetic image; and updating the user profile by generating user metadata based on additional outputs of the one or more machine learning models associated with a later query.

14. One or more non-transitory, computer-readable media storing instructions that, when executed by one or more processors, cause operations comprising:

obtaining, based on a query, an item description of a first item;

providing previous queries of a user profile, the query, and the item description to one or more machine learning models to cause the one or more machine learning models to generate a first synthetic image and a text output that comprises an indication of a plurality of features corresponding to the item description, wherein characteristics of the first synthetic image correspond to the plurality of features;

determining that one or more characteristics of the first synthetic image do not satisfy a set of matching criteria associated with the first item;

generating a second synthetic image based on the one or more characteristics of the first synthetic image not satisfying the set of matching criteria;

generating a graphical representation of the first item comprising the second synthetic image and a representation of the text output;

receiving a selection of the graphical representation of the first item; and in response to receiving the selection of the graphical representation of the first item, updating the one or more machine learning models by retraining the one or more machine learning models based on the text output and the second synthetic image.

15. The one or more non-transitory, computer-readable media of claim 14, wherein obtaining the item description comprises:

determining, based on the query, a plurality of requested characteristics describing a requested item;

obtaining a plurality of characteristic sets, wherein each characteristic set of the plurality of characteristic sets comprises a corresponding plurality of item characteristics associated with a corresponding item;

comparing each characteristic set of the plurality of characteristic sets with the plurality of requested characteristics;

in response to comparing each characteristic set of the plurality of characteristic sets with the plurality of requested characteristics, determining the first item; and retrieving, from an item database, the item description of the first item.

16. The one or more non-transitory, computer-readable media of claim 15, wherein, in response to comparing each characteristic set of the plurality of characteristic sets with the plurality of requested characteristics, determining the first item comprises:

generating a plurality of similarity metrics, wherein each similarity metric of the plurality of similarity metrics indicates a similarity between a requested characteristic of the plurality of requested characteristics and a corresponding characteristic set, for a corresponding item, of the plurality of characteristic sets;

determining that a first similarity metric of the plurality of similarity metrics meets a threshold similarity metric; and determining the first item, wherein the first item corresponds to the first similarity metric.

17. The one or more non-transitory, computer-readable media of claim 16, the operations further comprising:

determining a subset of similarity metrics of the plurality of similarity metrics, wherein each similarity metric of the subset of similarity metrics meets the threshold similarity metric;

generating a ranked list of a plurality of graphical indications of items comprising a graphical indication, wherein the plurality of graphical indications of items are ranked according to the plurality of similarity metrics; and presenting the graphical indication.

18. The one or more non-transitory, computer-readable media of claim 14, further comprising:

obtaining a first characteristic set corresponding to a first item, wherein the first characteristic set includes characteristics describing the first item;

determining whether the characteristics of the first synthetic image correspond to the first characteristic set; and based on determining that a first characteristic of the first synthetic image does not correspond to the first characteristic set, providing, the query, and the first item description to the one or more machine learning models to generate a second synthetic image distinct from the first synthetic image.

* * * * *